US012770563B2

(12) United States Patent
Hong et al.

(10) Patent No.: US 12,770,563 B2
(45) Date of Patent: Oct. 20, 2026

(54) DISPLAY DEVICE INCLUDING A DISCHARGING ELEMENT AND DRIVING METHOD

(71) Applicant: LG Display Co., Ltd., Seoul (KR)

(72) Inventors: Yumin Hong, Paju-si (KR); Byungjae Lee, Paju-si (KR); Seongen Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/020,548

(22) Filed: Jan. 14, 2025

(65) Prior Publication Data

US 2025/0239225 A1 Jul. 24, 2025

(30) Foreign Application Priority Data

Jan. 19, 2024 (KR) ........................ 10-2024-0008687

(51) Int. Cl.
*G09G 3/3233* (2016.01)

(52) U.S. Cl.
CPC ... *G09G 3/3233* (2013.01); *G09G 2300/0842* (2013.01); *G09G 2310/08* (2013.01); *G09G 2330/021* (2013.01)

(58) Field of Classification Search
CPC ...... G09G 3/3233; G09G 3/20; G09G 3/3208; G09G 2300/0842; G09G 2310/08; G09G 2310/0243; G09G 2310/0264; G09G 2330/021; G09G 2330/02; G09G 2330/028
See application file for complete search history.

(56) References Cited

U.S. PATENT DOCUMENTS

2012/0113161 A1* 5/2012 Hong ..................... G09G 3/003 345/690
2013/0147697 A1* 6/2013 Sung ..................... G02F 1/1368 345/87
2014/0092075 A1* 4/2014 Lee ......................... G05F 1/468 345/212
2015/0280422 A1* 10/2015 Harvey .................... H02H 3/08 361/35
2017/0092218 A1* 3/2017 Wei ...................... G09G 3/3648
2022/0122512 A1* 4/2022 Lee ...................... G09G 3/3233

FOREIGN PATENT DOCUMENTS

CN 109493817 A * 3/2019 ........... G09G 3/3696

* cited by examiner

*Primary Examiner* — Stephen G Sherman
(74) *Attorney, Agent, or Firm* — Seed Intellectual Property Law Group LLP

(57) ABSTRACT

Embodiments of the present disclosure relate to a display device and a driving method of the same. A display device according to embodiments of the present disclosure may include a comparison circuit for comparing the source driving voltage and a reference driving voltage and outputting a second control signal, and a discharge circuit for comparing the first control signal and the second control signal output from the comparison circuit and discharging the source driving voltage, thereby stably controlling a voltage.

20 Claims, 16 Drawing Sheets

| En1 | En2 | Discharging Mode |
|---|---|---|
| H | H | On |
| H | L | Off |
| L | H | Off |
| L | L | Off |

DISPLAY DEVICE INCLUDING A DISCHARGING ELEMENT AND DRIVING METHOD

CROSS REFERENCE TO RELATED APPLICATION

This application claims priority from Korean Patent Application No. 10-2024-0008687, filed on Jan. 19, 2024, which is hereby incorporated by reference for all purposes as if fully set forth herein.

BACKGROUND

Technical Field

Embodiments of the present disclosure relate to a display device and a driving method.

Description of the Related Art

As the information society develops, the demand for display devices for displaying images is increasing in various forms, and in recent years, various display devices such as liquid crystal displays and organic light emitting display devices have been used.

A display device may include a display panel, a data driving circuit, a gate driving circuit, a controller, and a power management integrated circuit.

The power management integrated circuit may generate various voltages for driving a display device.

The period during which the display panel is driven may include an active period and a blank period.

Since a voltage required in the active period and a voltage required in the blank period may be different from each other, the voltage required in each period may be changed.

BRIEF SUMMARY

Embodiments of the present disclosure may provide a display device capable of stably controlling a source driving voltage.

Embodiments of the present disclosure may provide a display device capable of stably controlling a reference voltage.

Embodiments of the present disclosure may provide a display device capable of supplying stable voltage during an active period.

Embodiments of the present disclosure may provide a display device capable of lower power consumption by stably controlling a voltage.

Embodiments of the present disclosure may provide a display device including a display panel on which a plurality of subpixels are disposed, a data driving circuit for driving the display panel, a power management integrated circuit for supplying a source driving voltage to the data driving circuit, a controller for controlling the power management integrated circuit and outputting a first control signal, a comparison circuit for comparing the source driving voltage and a reference driving voltage and outputting a second control signal, and a discharge circuit for comparing the first control signal and the second control signal output from the comparison circuit and discharging the source driving voltage.

The comparison circuit may output the second control signal in a high level state to the discharge circuit if the source driving voltage is greater than the reference driving voltage.

The discharge circuit may discharge the source driving voltage in response to receive the second control signal in the high level state and the first control signal in a high level state.

Embodiments of the present disclosure may provide a display device including a driving method of a display device including outputting, by a controller controlling a data driving circuit, a first control signal to a discharge circuit, comparing, by a comparison circuit, a source driving voltage and a reference driving voltage and outputting a second control signal, comparing, by the discharge circuit, the first control signal and the second control signal, and discharging, by the discharge circuit, the source driving voltage.

According to embodiments of the present disclosure, it is possible to provide a display device capable of stably controlling a source driving voltage.

According to embodiments of the present disclosure, it is possible to provide a display device capable of stably controlling a reference voltage.

According to embodiments of the present disclosure, it is possible to provide a display device capable of supplying stable voltage during an active period.

According to embodiments of the present disclosure, it is possible to provide a display device capable of lower power consumption by stably controlling a voltage.

DETAILED DESCRIPTION

Figure 1:
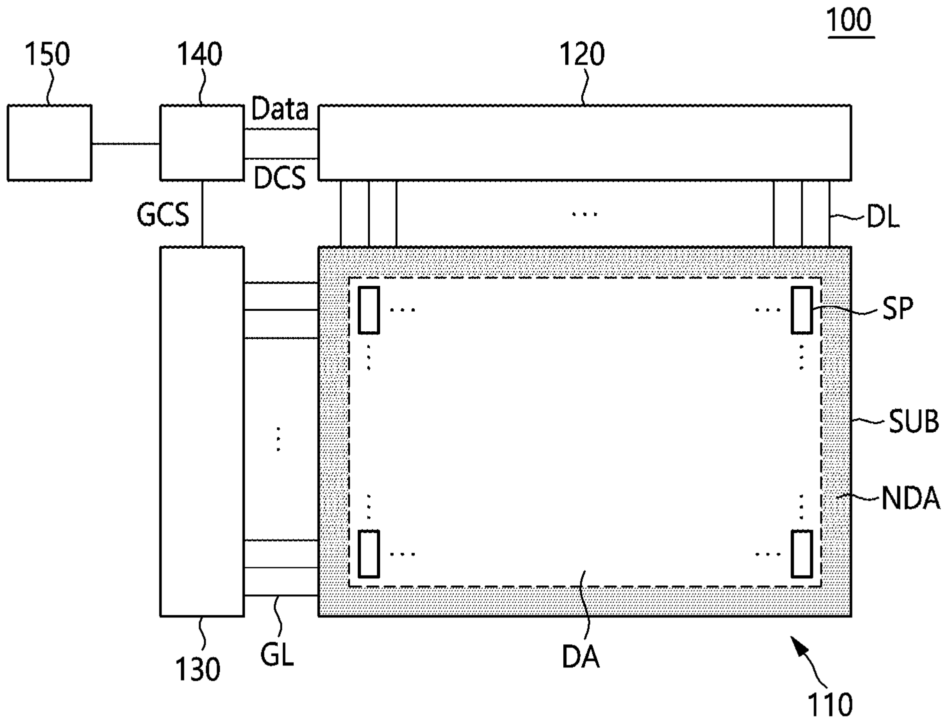
FIG. 1 is a system configuration diagram of a display device according to embodiments of the present disclosure.

Hereinafter, embodiments of the disclosure are described in detail with reference to the accompanying drawings. In assigning reference numerals to components of each drawing, the same components may be assigned the same numerals even when they are shown on different drawings. When determined to make the subject matter of the disclosure unclear, the detailed of the known art or functions may be skipped. As used herein, when a component "includes," "has," or "is composed of" another component, the component may add other components unless the component "only" includes, has, or is composed of" the other component. As used herein, the singular forms "a," "an" and "the" are intended to include the plural forms as well, unless the context clearly indicates otherwise.

Such denotations as "first," "second," "A," "B," "(a)," and "(b)," may be used in describing the components of the disclosure. These denotations are provided merely to distinguish a component from another, and the essence, order, or number of the components are not limited by the denotations.

In describing the positional relationship between components, when two or more components are described as "connected," "coupled" or "linked," the two or more components may be directly "connected," "coupled" or "linked," "or another component may intervene. Here, the other component may be included in one or more of the two or more components that are "connected," "coupled" or "linked" to each other.

When such terms as, e.g., "after," "next to," "after," and "before," are used to describe the temporal flow relationship related to components, operation methods, and fabricating methods, it may include a non-continuous relationship unless the term "immediately" or "directly" is used.

When a component is designated with a value or its corresponding information (e.g., level), the value or the corresponding information may be interpreted as including a tolerance that may arise due to various factors (e.g., process factors, internal or external impacts, or noise).

Hereinafter, various embodiments of the disclosure are described in detail with reference to the accompanying drawings.

FIG. 1 is a system configuration diagram of a display device according to embodiments of the present disclosure.

FIG. 1 is a system configuration diagram of a display device 100 according to embodiments of the present disclosure.

Referring to FIG. 1, a display device 100 according to embodiments of the present disclosure may include a display panel 110 and a driving circuit for driving the display panel 110.

The driving circuit may include a data driving circuit 120 and a gate driving circuit 130, and may further include a controller 140 which controls the data driving circuit 120 and the gate driving circuit 130.

The display panel 110 may include a substrate SUB and signal lines such as a plurality of data lines DL and a plurality of gate lines GL disposed on the substrate SUB. The display panel 110 may include a plurality of subpixels SP connected to a plurality of data lines DL and a plurality of gate lines GL.

The display panel 110 may include a display area DA where an image is displayed and a non-display area NDA where an image is not displayed. In the display panel 110, a plurality of subpixels SP for displaying an image may be disposed in the display area DA. In the non-display area NDA, the driving circuits 120, 130 and 140 may be electrically connected or the driving circuits 120, 130 and 140 may be mounted, or there may be disposed a pad portion to which an integrated circuit or printed circuit is connected.

The data driving circuit 120 is a circuit for driving a plurality of data lines DL, and may supply data signals to the plurality of data lines DL. The gate driving circuit 130 is a circuit for driving a plurality of gate lines GL, and may supply gate signals to the plurality of gate lines GL. The controller 140 may supply a data control signal DCS to the data driving circuit 120 to control the operation timing of the data driving circuit 120. The controller 140 may supply a gate control signal GCS to the gate driving circuit 130 to control the operation timing of the gate driving circuit 130.

The controller 140 may start scanning according to the timing implemented in each frame, convert the input image data input from the outside to fit the data signal format used in the data driving circuit 120, supply the converted image data Data to the data driving circuit 120, and control a data drive at an appropriate time according to the scan.

The controller 140 may receive various timing signals including a vertical synchronization signal VSYNC, a horizontal synchronization signal HSYNC, an input data enable signal DE, and a clock signal CLK along with input image data from the outside (e.g., the host system 150).

In order to control the data driving circuit 120 and the gate driving circuit 130, the controller 140 may receive timing signals such as a vertical synchronization signal VSYNC, a horizontal synchronization signal HSYNC, an input data enable signal DE and a clock signal CLK, and generate various control signals DCS and GCS to output to the data driving circuit 120 and the gate driving circuit 130.

For example, the controller 140 may output various gate control signals GCS including a gate start pulse GSP, a gate shift clock GSC and gate output enable signal GOE in order to control the gate driving circuit 130.

In addition, in order to control the data driving circuit 120, the controller 140 may output various data control signals DCS such as a source start pulse SSP, a source sampling clock SSC, and a source output enable signal SOE.

The controller 140 may be implemented as a separate component from the data driving circuit 120, or may be integrated with the data driving circuit 120 and implemented as an integrated circuit.

The data driving circuit 120 may receive image data Data from the controller 140 and supply a data voltage to the plurality of data lines DL, thereby driving the plurality of data lines DL. Here, the data driving circuit 120 may be also called a source driving circuit.

The data driving circuit 120 may include one or more source driver integrated circuits SDIC.

Each source driver integrated circuit SDIC may include a shift register, a latch circuit, a digital to analog converter DAC, and an output buffer. In some cases, each source driver integrated circuit SDIC may further include an analog to digital converter ADC.

For example, each source driver integrated circuit SDIC may be connected to the display panel 110 using a tape automated bonding (TAB) method, or may be connected to a bonding pad of the display panel 110 using a chip-on-glass (COG) method or a chip-on-panel (COP) method, or may be connected to the display panel 110 by being implemented using a chip-on-film (COF) method.

The gate driving circuit 130 may output a gate signal of a turn-on level voltage or a gate signal of a turn-off level voltage according to the control of the controller 140. The gate driving circuit 130 may sequentially drive a plurality of gate lines GL by sequentially supplying a gate signal with a turn-on level voltage to the plurality of gate lines GL.

The gate driving circuit 130 may be connected to the display panel 110 using a tape automated bonding (TAB) method, or may be connected to a bonding pad of the display panel 110 using a chip-on-glass (COG) method or a chip-on-panel (COP) method, or may be connected to the display panel 110 by a chip-on-film (COF) method. Alternatively, the gate driving circuit 130 may be a gate-in-panel (GIP) type, and may be formed in the non-display area NDA of the display panel 110. The gate driving circuit 130 may be disposed on or connected to the substrate SUB. That is, if the gate driving circuit 130 is a GIP type, the gate driving circuit 130 may be disposed in the non-display area NDA of the substrate SUB. The gate driving circuit 130 may be connected to the substrate SUB in the case of a chip-on-glass (COG) type or chip-on-film (COF) type.

Meanwhile, at least one of the data driving circuit 120 and the gate driving circuit 130 may be disposed in the display area DA of the display panel 110. For example, at least one of the data driving circuit 120 and the gate driving circuit 130 may be disposed not to overlap the subpixels SP, and may be disposed to partially or entirely overlap the subpixels SP.

If a specific gate line GL is opened by the gate driving circuit 130, the data driving circuit 120 may convert the image data Data received from the controller 140 into an analog data voltage to supply to a plurality of data lines DL.

The data driving circuit 120 may be connected to one side (e.g., the upper or lower side) of the display panel 110. Depending on the driving method or panel design method, the data driving circuit 120 may be connected to both sides (e.g., upper and lower sides) of the display panel 110, or may be connected to two or more of the four sides of the display panel 110.

The gate driving circuit 130 may be connected to one side (e.g., left or right) of the display panel 110. Depending on the driving method or panel design method, the gate driving circuit 130 may be connected to both sides (e.g., left and right) of the display panel 110, or may be connected to two or more of the four sides of the display panel 110.

The controller 140 may be a timing controller used in typical display technology, or may be a control device capable of further performing other control functions including a timing controller, or may be a control device different from the timing controller, or may be a control device other than a timing controller, or may be a circuit within the control device. The display controller 140 may be implemented with various circuits or electronic components, such as an integrated circuit (IC), a field programmable gate array (FPGA), an application specific integrated circuit (ASIC), or Processor.

The controller 140 may be mounted on a printed circuit board, a flexible printed circuit, and may be electrically connected to the data driving circuit 120 and the gate driving circuit 130 through a printed circuit board, a flexible printed circuit.

The controller 140 may transmit and receive signals with the data driving circuit 120 according to one or more predetermined interfaces. For example, the interface may include a low voltage differential signaling (LVDS) interface, an embedded clock point-point interface (EPI) interface, or a serial peripheral interface (SPI).

The controller 140 may include a storage medium such as one or more registers.

The display device 100 according to the present embodiments may be a display including a back light unit such as a liquid crystal display, or may be a self-luminous display such as an organic light emitting diode (OLED) display, a quantum dot display, or a micro light emitting diode (Micro LED) display.

In the case that the display device 100 according to the present embodiments is an organic light emitting diode (OLED) display, each subpixel SP may include an organic light emitting diode (OLED) which emits light as a light emitting device. If the display device 100 according to the present embodiments is a quantum dot display, each subpixel SP may include a light emitting element made of quantum dots, which are semiconductor crystals that emit light on their own. If the display device 100 according to the present embodiments is a micro LED display, each subpixel SP may include a micro LED which is made of inorganic materials and emits light by itself as a light emitting device.

Figure 2A:
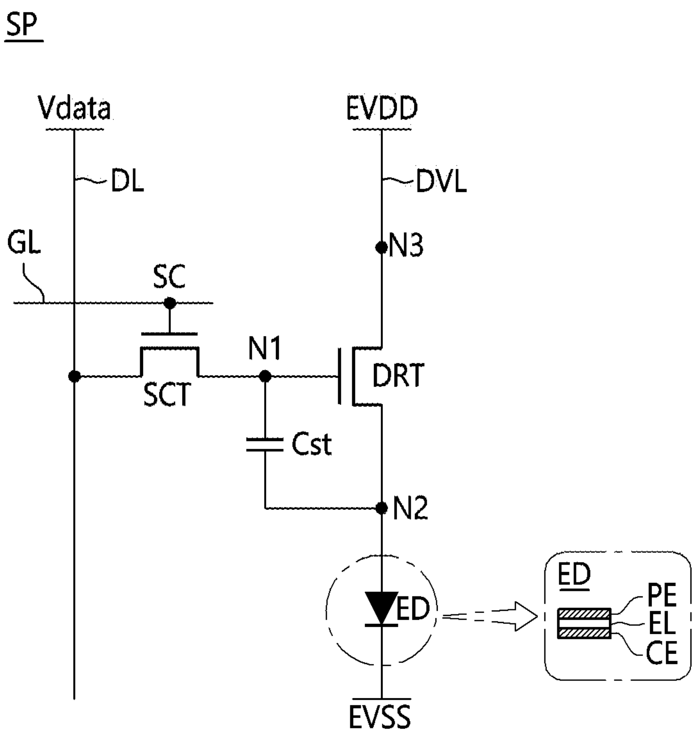
FIGS. 2A and 2B are equivalent circuits of a subpixel of a display device according to embodiments of the present disclosure.
Figure 2B:
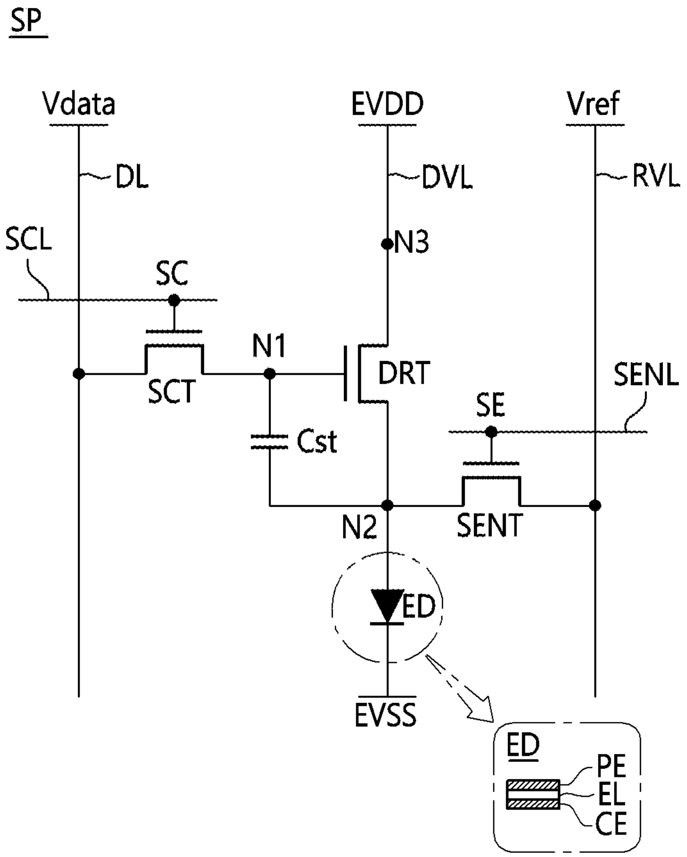

FIGS. 2A and 2B are equivalent circuits of a subpixel SP of a display device 100 according to embodiments of the present disclosure.

Referring to FIG. 2A, each of the plurality of subpixels SP disposed on the display panel 110 of the display device 100 according to embodiments of the present disclosure may includes a light emitting device ED and a driving transistor DRT, a scan transistor SCT, and a storage capacitor Cst.

Referring to FIG. 2A, the light emitting device ED may include a pixel electrode PE and a common electrode CE, and a light emission layer EL located between the pixel electrode PE and the common electrode CE.

The pixel electrode PE of the light emitting device ED may be an electrode disposed in each subpixel SP, and the common electrode CE may be an electrode commonly disposed in all subpixels SP. Here, the pixel electrode PE may be an anode electrode and the common electrode CE may be a cathode electrode. Conversely, the pixel electrode PE may be a cathode electrode and the common electrode CE may be an anode electrode.

For example, the light emitting device ED may be an organic light emitting diode (OLED), a light emitting diode (LED), or a quantum dot light emitting device.

The driving transistor DRT is a transistor for driving the light emitting device ED, and may include a first node N1, a second node N2, and a third node N3.

The first node N1 of the driving transistor DRT may be a gate node of the driving transistor DRT, and may be electrically connected to a source node or a drain node of the scan transistor SCT. The second node N2 of the driving transistor DRT may be a source node or a drain node of the driving transistor DRT, and may be electrically connected to a source node or a drain node of the sensing transistor SENT, and may be electrically connected to the pixel electrode PE of the light emitting device ED. The third node N3 of the driving transistor DRT may be electrically connected to a driving voltage line DVL which supplies a driving voltage EVDD.

The scan transistor SCT may be controlled by a scan signal SC, which is a type of gate signal, and may be connected between the first node N1 of the driving transistor DRT and a data line DL. That is, the scan transistor SCT may be turned on or turned off depending on the scan signal SC supplied from a scan signal line SCL, which is a type of gate line GL to control he connection between the first nodes N1 of the driving transistor DRT, and the data line DL.

The scan transistor SCT may be turned on by the scan signal SC having a turn-on level voltage, and may transmit a data voltage Vdata supplied from the data line DL to the first node N1 of the driving transistor DRT.

Here, if the scan transistor SCT is an n-type transistor, the turn-on level voltage of the scan signal SC may be a high level voltage. If the scan transistor SCT is a p-type transistor, the turn-on level voltage of the scan signal SC may be a low level voltage.

Each of the scan transistor SCT and the the driving transistor DRT may be an n-type transistor or a p-type transistor.

The storage capacitor Cst may be connected between the first node N1 and the second node N2 of the driving transistor DRT. The storage capacitor Cst may be charged with a charge corresponding to the voltage difference between both ends, and may maintain the voltage difference between both ends for a set frame time period. Accordingly, the corresponding subpixel SP may emit light during a set frame time period.

Referring to FIG. 2B, each of the plurality of subpixels SP disposed on the display panel 110 of the display device 100 according to embodiments of the present disclosure may further include a sensing transistor SENT.

The sensing transistor SENT may be controlled by a sense signal SE, which is a type of gate signal, and may be connected between the second node N2 of the driving transistor DRT and a reference voltage line RVL. That is, the sensing transistor SENT may be turned on or turned off depending on the sense signal SE supplied from a sense signal line SENL, which is another type of gate line GL, and may be turned on and turned off to control the connection between the reference voltage line RVL and the second node N2 of the driving transistor DRT.

The sensing transistor SENT may be turned on by the sense signal SE having a turn-on level voltage, and may transfer a reference voltage Vref supplied from the reference voltage line RVL to the second node N2 of the driving transistor DRT.

In addition, the sensing transistor SENT may be turned on by the sense signal SE having a turn-on level voltage, and may transfer the voltage of the second node N2 of the driving transistor DRT to the reference voltage line RVL.

In addition, the sensing transistor SENT may be turned off by the sense signal SE having a turn-off level voltage, so that the second node N2 of the driving transistor DRT and the reference voltage line RVL may be electrically separated.

Here, in the case that the sensing transistor SENT is an n-type transistor, the turn-on level voltage of the sense signal SE may be a high level voltage. If the sensing transistor SENT is a p-type transistor, the turn-on level voltage of the sense signal SE may be a low level voltage.

The function of the sensing transistor SENT to transfer the voltage of the second node N2 of the driving transistor DRT to the reference voltage line RVL may be used when driving to sense the characteristic value of the subpixel SP. In this case, the voltage transmitted to the reference voltage line RVL may be a voltage for calculating the characteristic value of the subpixel SP or a voltage reflecting the characteristic value of the subpixel SP.

In the present disclosure, the characteristic value of the subpixel SP may be the characteristic value of the driving transistor DRT or the light emitting device ED. The characteristic value of the driving transistor DRT may include a threshold voltage and a mobility of the driving transistor DRT. The characteristic value of the light emitting device ED may include a threshold voltage of the light emitting device ED.

Each of the driving transistor DRT, the scan transistor SCT, and the sensing transistor SENT may be an n-type transistor or a p-type transistor. In this disclosure, for convenience of explanation, it will be exemplified a case in which the driving transistor DRT, scan transistor SCT, and sensing transistor SENT are each n-type.

The storage capacitor Cst may be an external capacitor intentionally designed outside the driving transistor DT rather than a parasitic capacitor (e.g., Cgs, Cgd) as an internal capacitor which exists between the gate node and the source node (or the drain node) of the driving transistor DRT.

The scan signal line SCL and sense signal line (SENL) may be different gate lines GL. In this case, the scan signal SC and the sense signal SE may be separate gate signals, and the on-off timing of the scan transistor SCT and the on-off timing of the sensing transistor SENT within one subpixel SP may be independent. That is, the on-off timing of the scan transistor SCT and the on-off timing of the sensing transistor SENT within one subpixel SP may be the same or different.

Alternatively, the scan signal line SCL and the sense signal line SENL may be the same gate line GL. That is, the gate node of the scan transistor SCT and the gate node of the sensing transistor SENT within one subpixel SP may be connected to one gate line GL. In this case, the scan signal SC and the sense signal SE may be the same gate signal, and the on-off timing of the scan transistor SCT and the on-off timing of the sensing transistor SENT within one subpixel SP may be the same.

The structure of the subpixel SP shown in FIGS. 2A and 2B is only an example and may be modified in various ways by including one or more transistors or one or more capacitors.

In FIGS. 2A and 2B, the subpixel structure is explained assuming that the display device 100 is a self-luminous display device. However, if the display device 100 is a liquid crystal display device, each subpixel SP may include a transistor and a pixel electrode.

Figure 3:
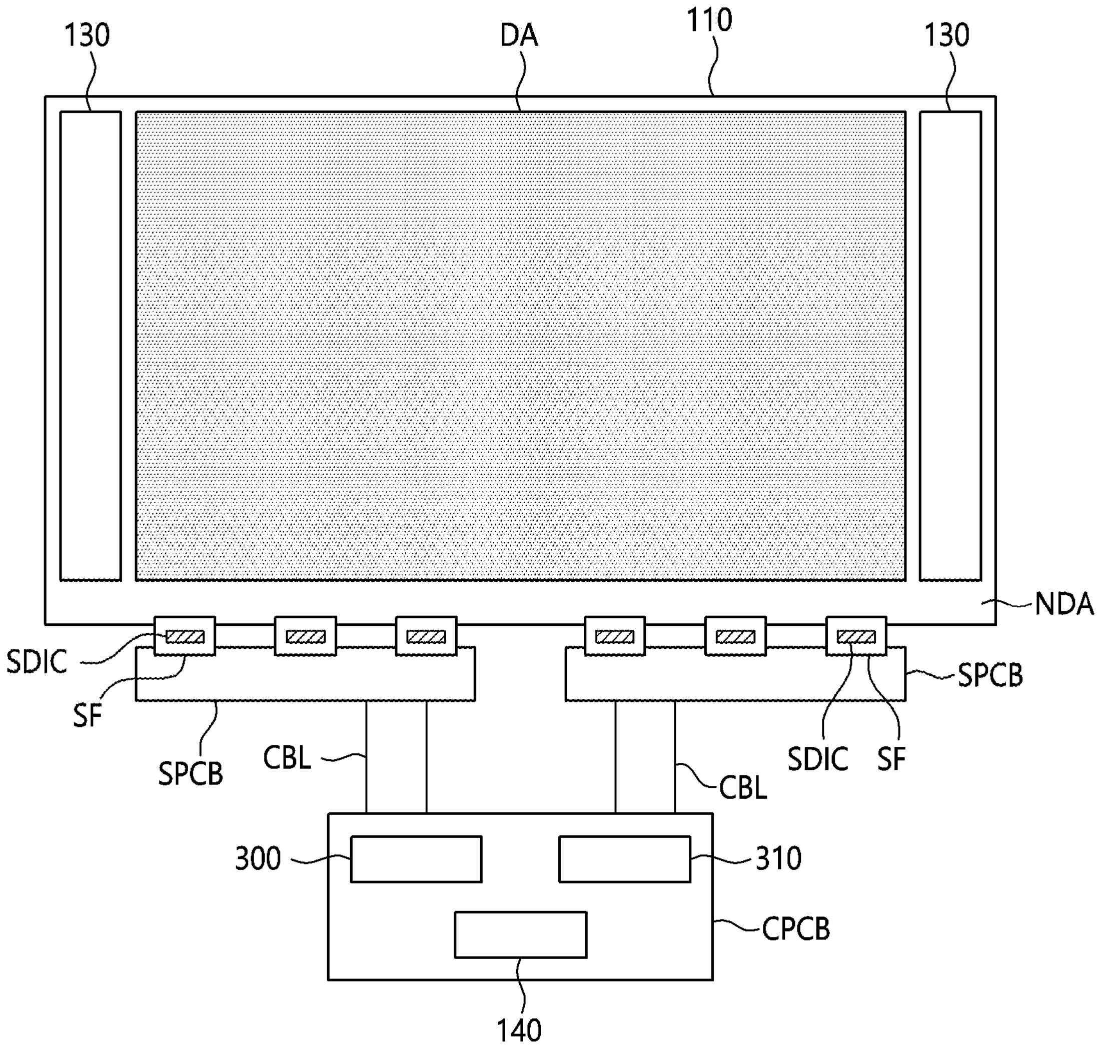
FIG. 3 illustrates a system of a display device according to embodiments of the present disclosure.

FIG. 3 illustrates a system of a display device 100 according to embodiments of the present disclosure.

Referring to FIG. 3, the display panel 110 may include a display area DA where an image is displayed and a non-display area NDA where an image is not displayed. The non-display area NDA may be an outer area of the display area DA, and may also be referred to as a bezel area or edge area.

Referring to FIG. 3, if the data driving circuit 120 includes one or more source driver integrated circuits SDIC and is implemented in a chip-on-film (COF) method, each source driver integrated circuit SDIC may be mounted on a circuit film SF connected to the non-display area NDA of the panel 110.

Referring to FIG. 3, the gate driving circuit 130 may be implemented as a gate-in-panel (GIP) type. In this case, the gate driving circuit 130 may be formed in the non-display area NDA of the display panel 110. Unlike FIG. 3, the gate driving circuit 130 may be implemented as a chip-on-film (COF) type.

For circuit connection between one or more source driver integrated circuits SDIC and other devices, the display device 100 may include at least one source printed circuit board SPCB and a control printed circuit board CPCB for mounting control components and various electrical devices.

A film SF on which a source driver integrated circuit SDIC is mounted may be connected to at least one source printed circuit board SPCB. That is, one side of the film SF on which the source driver integrated circuit SDIC is mounted may be electrically connected to the display panel 110 and the other side may be electrically connected to the source printed circuit board SPCB.

The controller 140 and a power management integrated circuit (PMIC) 310 may be mounted on the control printed circuit board CPCB. The controller 140 may perform overall control functions related to driving the display panel 110 and control the operations of the data driving circuit 120 and the gate driving circuit 130. The power management integrated circuit 310 may supply various voltages or currents to the data driving circuit 120 and the gate driving circuit 130, or control various voltages or currents to be supplied.

At least one source printed circuit board SPCB and a control printed circuit board CPCB may be circuitly connected through at least one connection cable CBL. Here, the connection cable CBL may be, for example, a flexible printed circuit (FPC), a flexible flat cable (FFC), etc.

At least one source printed circuit board SPCB and a control printed circuit board CPCB may be integrated and implemented as a single printed circuit board.

The display device 100 according to embodiments of the present disclosure may further include a level shifter 300 for adjusting the voltage level. For example, the level shifter 300 may be disposed on a control printed circuit board CPCB or a source printed circuit board SPCB.

In particular, in the display device 100 according to embodiments of the present disclosure, the level shifter 300 may supply signals necessary for gate driving to the gate driving circuit 130. For example, the level shifter 300 may supply a plurality of clock signals to the gate driving circuit 130. Accordingly, the gate driving circuit 130 may output a plurality of gate signals to a plurality of gate lines GL based on a plurality of clock signals input from the level shifter 300. Here, the plurality of gate lines GL may transmit a plurality of gate signals to the subpixels SP disposed in the display area DA of the substrate SUB.

Figure 4:
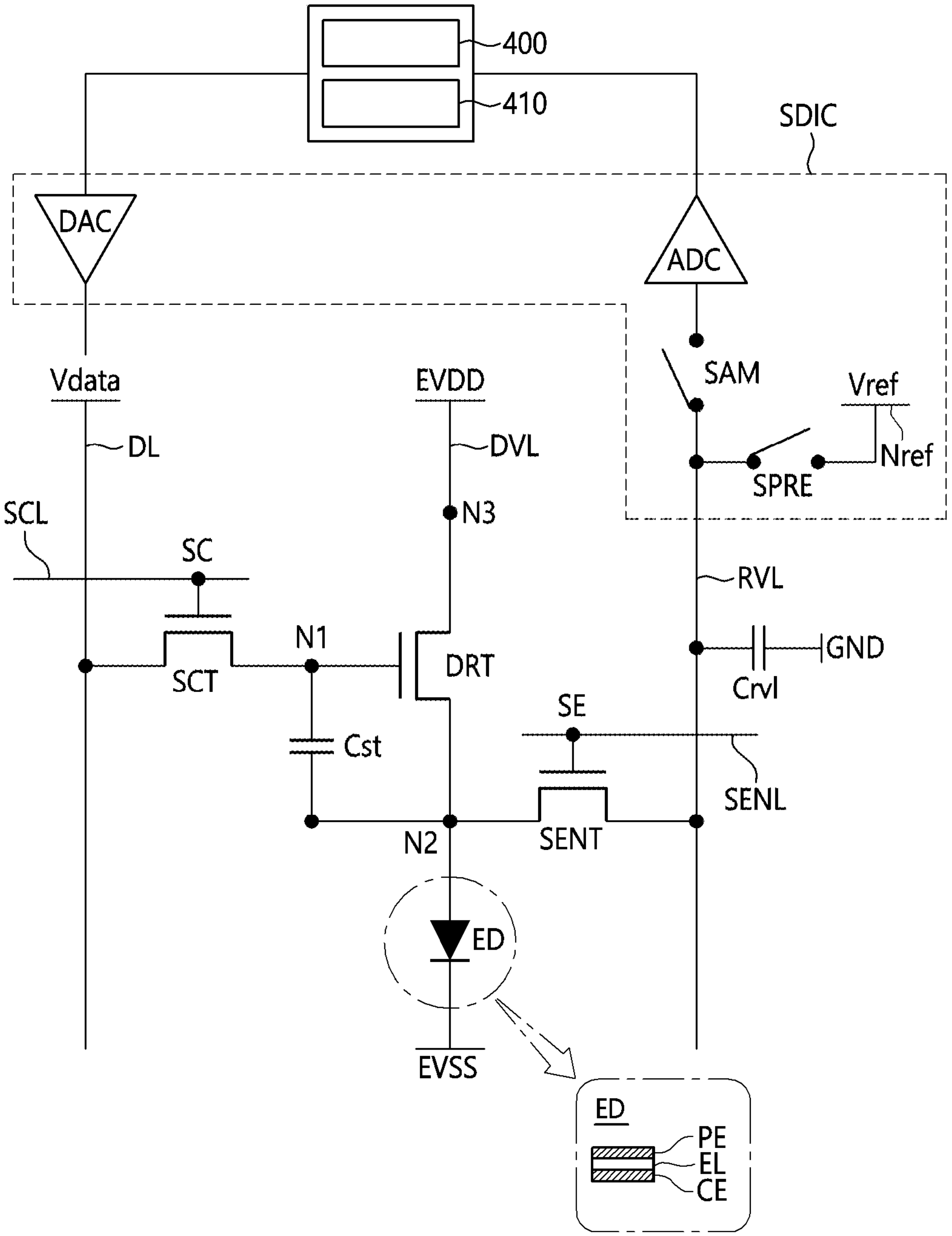
FIG. 4 illustrates a compensation circuit of a display device according to embodiments of the present disclosure.

FIG. 4 illustrates a compensation circuit of a display device 100 according to embodiments of the present disclosure.

Referring to FIG. 4, the compensation circuit may be a circuit capable of performing sensing and compensation processing for the characteristic values of circuit elements within the subpixel SP.

The compensation circuit may be connected to the subpixel SP, and may include a power switch SPRE, a sampling switch SAM, an analog-to-digital converter ADC, and a compensator 400.

The power switch SPRE may control the connection between the reference voltage line RVL and a reference voltage supply node Nref. For example, when the power switch SPRE is turned on, the reference voltage line RVL is electrically connected to a reference voltage supply node Nref. In this case, A reference voltage Vref output from the power supply may be supplied to the reference voltage supply node Nref, and the reference voltage Vref supplied to the reference voltage application node Nref may be supplied to the reference voltage line RVL.

The sampling switch SAM may control the connection between the analog-to-digital converter ADC and the reference voltage line RVL. For example, when the sampling switch SAM is turned on, the analog-to-digital converter ADC is electrically connected to the reference voltage line RVL. If the analog-to-digital converter ADC is connected to the reference voltage line RVL by the sampling switch (SAM), the analog-to-digital converter ADC may convert the voltage (e.g., analog voltage) of the connected reference voltage line RVL into a sensing value corresponding to a digital value.

A line capacitor Crvl may be formed between the reference voltage line RLV and a ground GND. The voltage of the reference voltage line RVL may correspond to the charge amount of the line capacitor Crvl.

The analog-to-digital converter ADC may provide sensing data including sensing values to the compensator 400.

The compensator 400 may determine the characteristic value of the light emitting device ED or the driving transistor DRT included in the corresponding subpixel SP based on the sensing data, calculate a compensation value, and store the compensation value in a memory 410.

For example, the compensation value may be information for reducing the characteristic value deviation between the light emitting devices ED or the characteristic value deviation between the driving transistors DRT, and may include an offset and a gain value for data change.

The controller 140 may change image data using the compensation value stored in the memory 410, and supply the changed image data to the data driving circuit 120.

The data driving circuit 120 may use a digital-to-analog converter DAC to convert the changed image data into a data voltage Vdata corresponding to an analog voltage and output the data voltage Vdata. Accordingly, compensation may be performed.

Referring to FIG. 4, the analog-to-digital converter ADC, the power switch SPRE, and the sampling switch SAM may be included in a source driver integrated circuit SDIC included in the data driving circuit 120. The compensator 400 may be included in controller 140.

As described above, the display device 100 according to embodiments of the present disclosure may perform compensation processing to reduce the deviation of characteristic values between the driving transistors DRT. In addition, in order to perform compensation processing, the display device 100 may perform a sensing driving to find out the deviation of characteristic values between the driving transistors DRT.

The display device 100 according to embodiments of the present disclosure may perform sensing driving in two modes (e.g., fast mode and slow mode). Hereinafter, it will be described a sensing driving in two modes (e.g., fast mode and slow mode) with reference to FIGS. 5A and 5B.

Figure 5A:
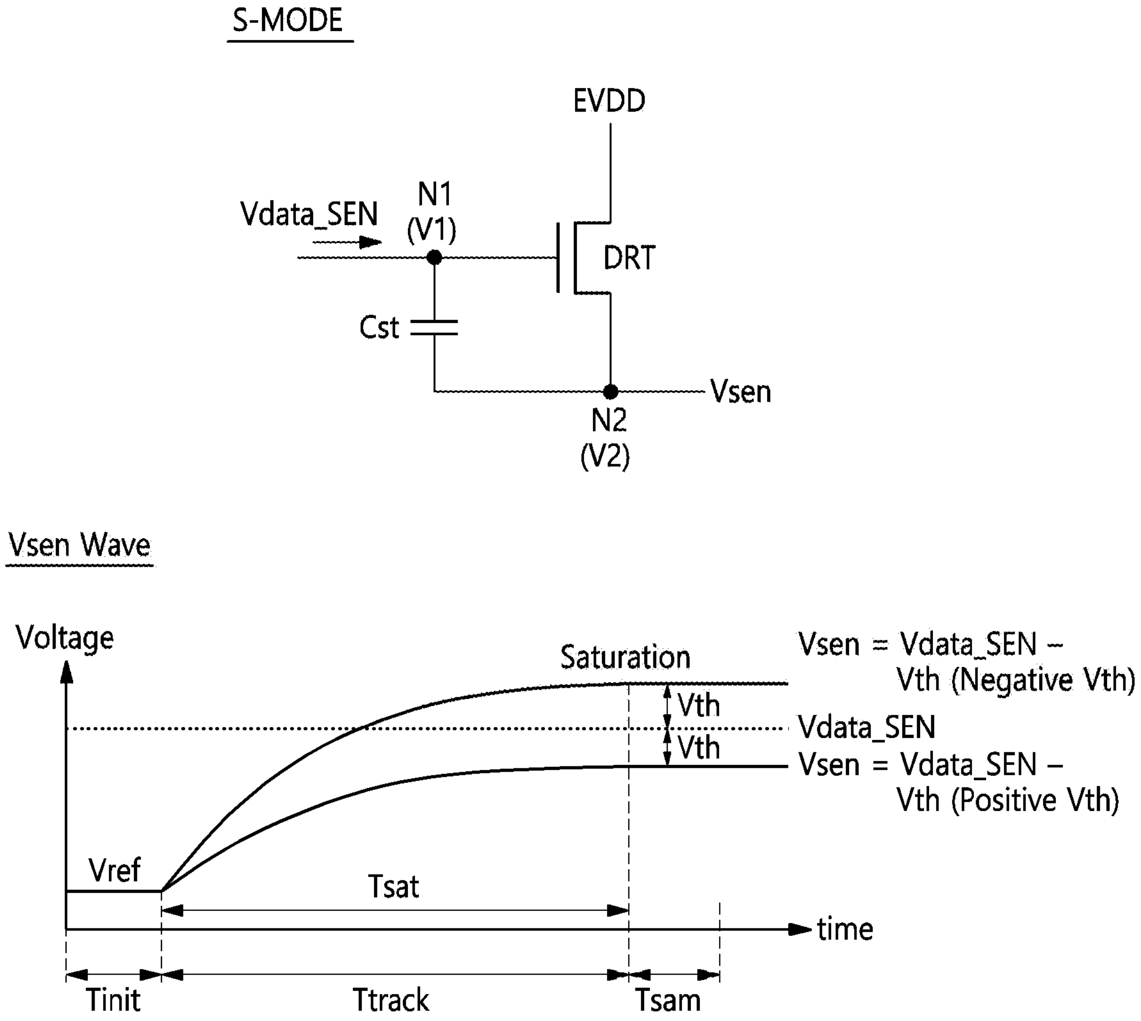
FIG. 5A is a diagram of a first sensing mode of a display device according to embodiments of the present disclosure.
Figure 5B:
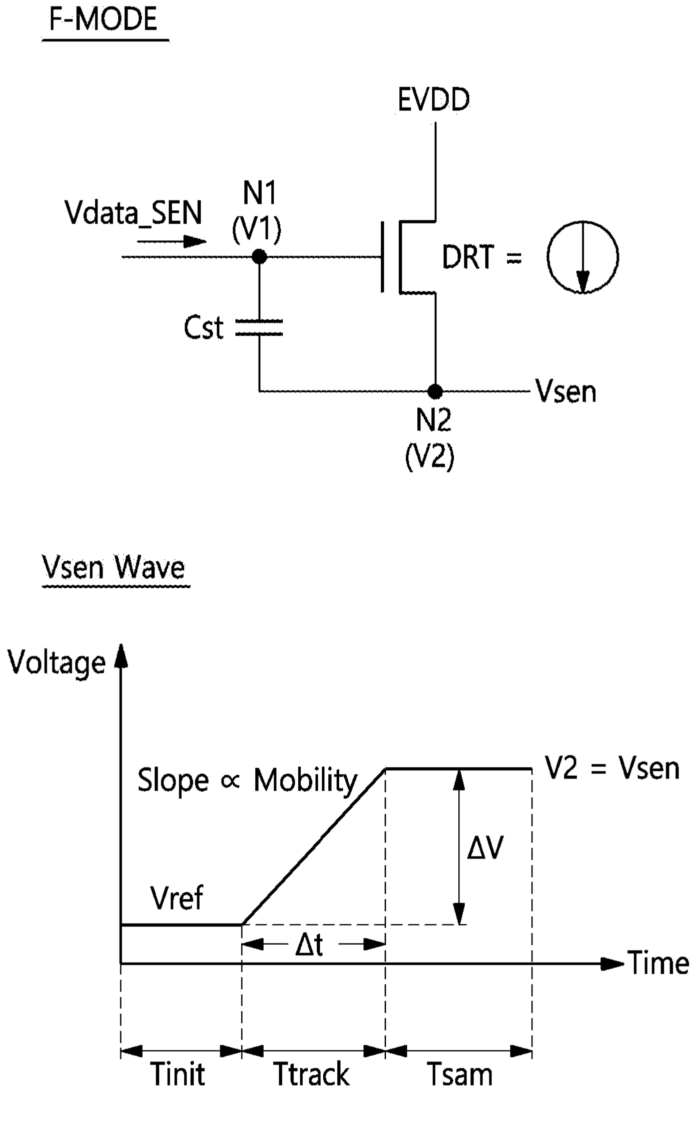
FIG. 5B is a diagram of a second sensing mode of a display device according to embodiments of the present disclosure.

FIG. 5A illustrates a first sensing mode (i.e., S-Mode) of the display device 100 according to embodiments of the present disclosure. FIG. 5B illustrates a second sensing mode (i.e., F-Mode) of the display device 100 according to embodiments of the present disclosure. For example, the threshold voltage sensing may performed in the first sensing mode (S-Mode), and the mobility sensing may performed in second sensing mode (F-Mode), which will be described in detail below.

Referring to FIGS. 5A and 5B, the sensing driving period of the first sensing mode (i.e., S-Mode) and the sensing driving period of the second sensing mode (i.e., F-Mode) each may include an initialization period Tinit, a tracking period Ttrack, and a sampling period Tsam.

The sensing driving period of the first sensing mode (S-Mode) of the display device 100 will be described with reference to FIG. 5A.

During the initialization period Tinit, the voltage V1 of the first node N1 of the driving transistor DRT may be initialized to a data voltage Vdata_SEN for sensing driving, and the voltage of the second node N2 of the driving transistor DRT may be initialized to a reference voltage Vref for sensing driving.

During the initialization period Tinit, the scan transistor SCT and the sense transistor SENT may be turned on, and the power switch SPRE may be turned on to connect the reference voltage line RVL to a reference voltage supply node Nref.

During the tracking period Ttrack, the first node N1 of the driving transistor DRT may be in a constant voltage state with the data voltage Vdata_SEN for sensing driving, but the second node N2 of the driving transistor DRT may be electrically in a floating state. Accordingly, during the tracking period Ttrack, the voltage V2 of the second node N2 of the driving transistor DRT may change. For example, the voltage V2 of the second node N2 of the driving transistor DRT may increase over time, and eventually, the voltage V2 of the second node N2 of the driving transistor DRT may be saturated.

As the latter part of the tracking period Ttrack progresses, the voltage increase degree of the second node N2 of the driving transistor DRT may decrease, and eventually, the voltage V2 of the second node N2 of the driving transistor DRT may be saturated.

When the voltage V2 of the second node N2 of the driving transistor DRT is saturated, the sampling period Tsam may begin.

Referring to FIG. 5A, the sampling period (Tsam) during the sensing driving period of the first sensing mode (S-Mode) may be a period for measuring the voltage Vdata_SEN-Vth and Vdata_SEN-ΔVth reflecting a threshold voltage Vth of the driving transistor DRT or a change in the threshold voltage Vth of the driving transistor DRT. That is, the threshold voltage sensing may performed in the first sensing mode (S-Mode) due to the characteristic of requiring a long sensing time.

The sensing driving period of the second sensing mode (F-Mode) of the display device 100 will be described with reference to FIG. 5B.

During the initialization period Tinit, the voltage V1 of the first node N1 of the driving transistor DRT may be initialized to the data voltage Vdata_SEN for sensing driving, and the voltage V2 of the second node N2 may be initialized to the reference voltage Vref for sensing driving.

During the tracking period Ttrack, a preset tracking time Δt may be set short. Therefore, during a short tracking time Δt, it is difficult for the voltage V2 of the second node N2 of the driving transistor DRT to reflect the threshold voltage Vth. However, during a short tracking time Δt, the voltage V2 of the second node N2 of the driving transistor DRT can be changed enough to determine the mobility of the driving transistor DRT. That is, the mobility sensing may performed in second sensing mode (F-Mode) due to the characteristic of requiring a short sensing time.

During the tracking period Ttrack, the voltage V2 of the second node N2 of the driving transistor DRT may increase. At this time, the voltage V1 of the first node N1 of the driving transistor DRT may also increase.

After the tracking period Ttrack progresses for the preset tracking time Δt, that is, after the voltage V2 of the second node N2 of the driving transistor DRT rises for the preset tracking time Δt, the sampling period Tsam may proceed.

When the display device 100 supplies the data voltage Vdata for display driving to the corresponding subpixel SP, there may be supplied the data voltage Vata changed based on a threshold voltage compensation value and a mobility compensation value.

According to the above, the threshold voltage sensing may performed in the first sensing mode (S-Mode) due to the characteristic of requiring a long sensing time, and the mobility sensing may performed in second sensing mode (F-Mode) due to the characteristic of requiring a short sensing time.

Figure 6:
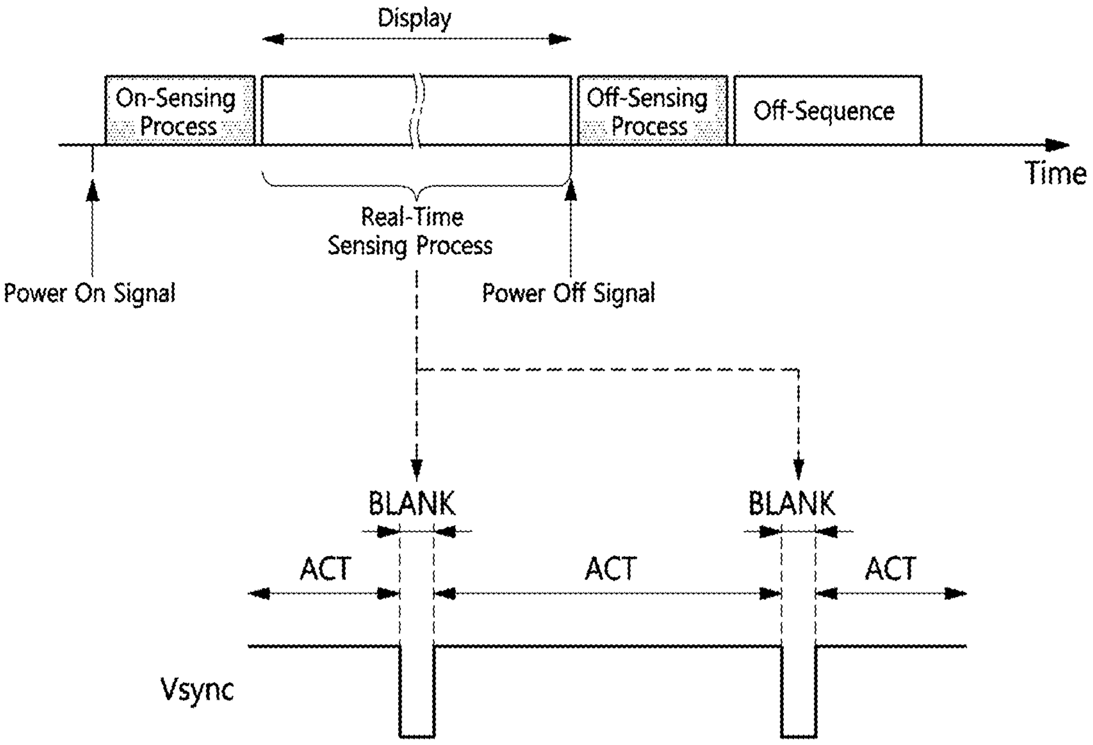
FIG. 6 illustrates various sensing timings of a display device according to embodiments of the present disclosure.

FIG. 6 illustrates various sensing timings of a display device 100 according to embodiments of the present disclosure.

Referring to FIG. 6, when a power-on signal is generated, the display device 100 according to embodiments of the present disclosure may sense the characteristic value of the driving transistor DRT within each subpixel SP disposed on the display panel 110. This sensing process may be referred to as an “on-sensing process”.

Referring to FIG. 6, when a power-off signal is generated, the display device 100 according to embodiments of the present disclosure may sense the characteristic value of the driving transistor DRT in each subpixel SP disposed on the display panel 110 before an off-sequence such as turning off the power is performed. This sensing process may be referred to as an “off-sensing process”.

Referring to FIG. 6, the display device 100 according to embodiments of the present disclosure may also sense the characteristic values of the driving transistor DRT within each subpixel SP during display driving from when a power-on signal is generated until a power-off signal is generated. This sensing process may be referred to as a “real-time sensing process”.

The real-time sensing process may be performed every blank period BLANK between active periods ACT, based on the vertical synchronization signal Vsync.

Since the mobility sensing of the driving transistor DRT requires only a short time, the mobility sensing may be performed in the second sensing mode (F-Mode) among the sensing driving methods.

Since the mobility sensing, which can be performed in the second sensing mode (F-Mode) as a fast mode, requires only a short time, the mobility sensing may be performed in any one of an on-sensing process, an off-sensing process, and a real-time-sensing process.

For example, the mobility sensing, which can be performed in the second sensing mode (F-Mode) as a fast mode, may be performed as a real-time sensing process capable of reflecting the mobility changes in real time during the display driving. That is, the mobility sensing may be performed every blank period during the display driving.

In comparison, the threshold voltage sensing of the driving transistor DRT may require a long saturation time Vsat. Accordingly, the threshold voltage sensing may be performed in the first sensing mode (S-Mode) among the sensing driving methods.

The threshold voltage sensing is performed using timing which does not interfere with the user’s viewing. Accordingly, threshold voltage sensing of the driving transistor DRT may be performed after a power-off signal is generated according to a user input, etc., while the display driving is not performed (i.e., a situation in which the user has no intention of viewing). That is, the threshold voltage sensing may be performed as an off-sensing process.

Figure 7:
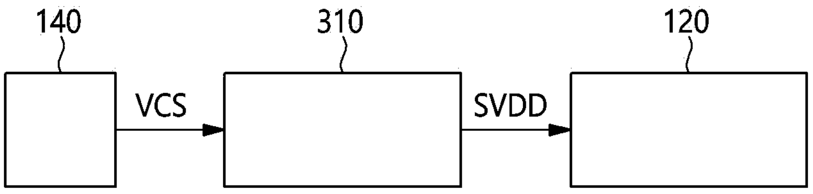
FIG. 7 illustrates a controller and power management integrated circuit according to embodiments of the present disclosure.

FIG. 7 illustrates a controller 140 and power management integrated circuit 310 according to embodiments of the present disclosure.

Referring to FIG. 7, the controller 140 may be electrically connected to the power management integrated circuit 310.

The controller 140 may supply a voltage control signal VCS to the power management integrated circuit 310.

The power management integrated circuit 310 may generate a source driving voltage SVDD based on the voltage control signal VCS.

The source driving voltage SVDD may be a voltage to drive the data driving circuit 120.

The power management integrated circuit 310 may output the source driving voltage SVDD to the data driving circuit 120.

The power management integrated circuit 310 may generate various voltages such as a driving voltage, a base voltage, and a reference voltage Vref in addition to the source driving voltage SVDD.

The power consumption of the display device 100 may be reduced by adjusting a voltage level of the source driving voltage SVDD depending on the driving environment of the display device 100. For example, in the case that the source driving voltage SVDD is relatively increased, there may be supplied a voltage control signal VCS to increase the source driving voltage SVDD to the power management integrated circuit 310. If it is to relatively lower the source driving voltage SVDD, a voltage control signal VCS for lowering the source driving voltage SVDD may be supplied to the power management integrated circuit 310. This may be referred to as an adaptive source driving voltage control method.

Figure 8:
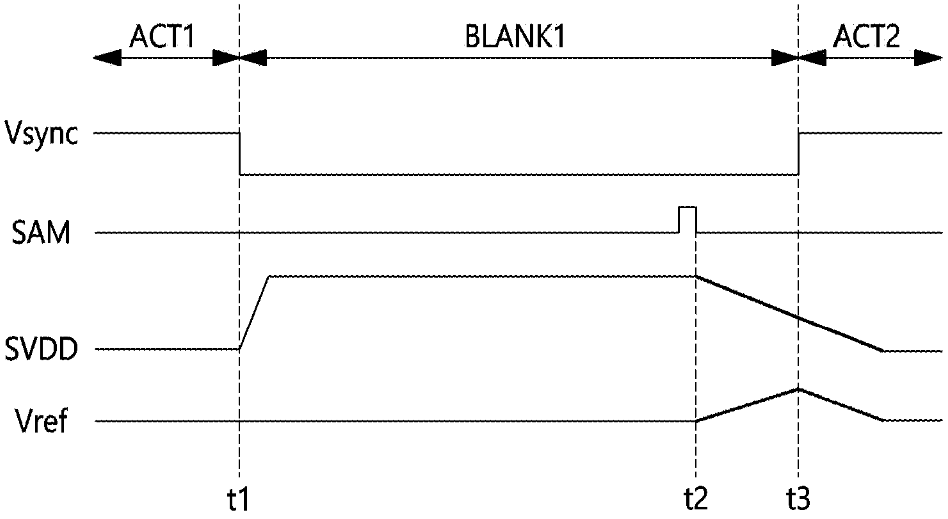
FIG. 8 is a timing diagram of an active period and a blank period according to embodiments of the present disclosure.

Referring to FIG. 8, if the adaptive source driving voltage control method is applied, the source driving voltage SVDD may change during the active periods ACT1 and ACT2, and the blank period BLANK1.

FIG. 8 is a timing diagram of an active period and a blank period according to embodiments of the present disclosure.

Referring to FIG. 8, a period during which the display panel 110 is driven may include an active period and a blank period. For example, there may proceed in the order of a first active period ACT1, a first blank period BLANK1, and a second active period ACT2.

Referring to FIG. 8, the active period may correspond to a period when the vertical synchronization signal Vsync is at a high level. The blank period may correspond to a period in which the vertical synchronization signal Vsync is at a low level.

Referring to FIG. 8, a real-time sensing process may proceed during the first blank period BLANK1. The real-time sensing process may include an initialization period, a tracking period, and a sampling period. That is, the sampling period may proceed in the first blank period BLANK1.

Referring to FIG. 8, the voltage level of the source driving voltage SVDD may increase during the sampling period. Referring to FIG. 8, the first blank period BLANK1 may start at a first time point t1. The voltage level of the source driving voltage SVDD may increase at the first time point t1. Before the display device 100 is shipped, a reference value (not shown) may be generated as the display device 100 is driven while a reference source driving voltage (not shown) is supplied to the data driving circuit 120. The reference value may be data which serves as a reference for external compensation. Since the reference value generated before shipment is data derived while the reference source driving voltage is supplied to the data driving circuit 120, even when the real-time sensing process, which is one of the external compensation methods, is performed, the source driving voltage SVDD may be set equal to the reference source voltage. For example, the reference source voltage may be 16.8 [V], but the reference source voltage may be greater or less than 16.8 [V]. Referring to FIG. 8, the source driving voltage SVDD during the first blank period BLANK1 may be greater than the source driving voltage SVDD during the active periods ACT1 and ACT2.

Referring to FIG. 8, after the sampling period terminates, the voltage level of the source driving voltage SVDD may be decreased. The source driving voltage SVDD, which has been increased for the real-time sensing process, may be decreased to a voltage level for the second active period ACT2. From a second time point t2, the voltage level of the source driving voltage SVDD may decrease. At this time, due to changes in the voltage level of the source driving voltage SVDD, the voltage level of the reference voltage Vref may become unstable. For example, the voltage level of the reference voltage Vref may increase or decrease. For example, referring to FIG. 8, the voltage level of the reference voltage Vref may increase from the second time point t2. Also, the voltage level of the reference voltage Vref may decrease from the third time point t3. However, since the reference voltage Vref is a voltage as a reference, the reference voltage Vref is required to be maintained at a constant value.

The relationship between the reference voltage Vref and the source driving voltage SVDD may be "reference voltage (Vref)=code value/1023*source driving voltage (SVDD)". Here, the code value may be digital data for controlling a level of the reference voltage Vref. Since the reference voltage Vref is a voltage as a reference, the reference voltage Vref is maintained at a constant value. If the source driving voltage SVDD decreases, the voltage level of the reference voltage Vref may be maintained by increasing the code value. At this time, the code value, which is a digital signal, is data capable of being increased immediately, while the voltage level of the source driving voltage SVDD, which is an analog signal, may decrease relatively slowly. That is, due to the difference of the change time between the digital signal and the analog signal, there may be a section in which the reference voltage Vref is temporarily increased, which may be a section between the second time point t2 and a third time point t3 shown in FIG. 8. Thereafter, as the source driving voltage SVDD decreases, the reference voltage Vref may also decrease. The section in which the reference voltage Vref is decreased may be a section after the third time point t3. The above-mentioned phenomenon of variation in the reference voltage Vref may be expressed as a fluctuation of the reference voltage Vref. Exemplary embodiments of the present disclosure may provide a display device capable of stably controlling a reference voltage.

The first active period ACT1 may proceed before the first blank period BLANK1, and the second active period ACT2 may proceed after the first blank period BLANK1. Since the adaptive SVDD control method is applied, the source driving voltage SVDD may be decreased to a voltage level during the second active period ACT2. The reference voltage Vref may be increased to a voltage level during the second active period ACT2.

In order for the second active period ACT2 to be stably driven, the voltage level of the source driving voltage SVDD is decreased to a predetermined voltage level before the second active period ACT2 starts. That is, after the sampling period included in the first blank period BLANK1, the voltage level of the source driving voltage SVDD may begin to decrease, and the voltage level is decreased to a predetermined voltage level before the second active period ACT2.

However, there may be delayed the time for the voltage level of the source driving voltage SVDD to decrease. In this case, the voltage level of the source driving voltage SVDD may decrease even after the second active period ACT2 begins. As the voltage level of the source driving voltage SVDD decreases even after the second active period ACT2 begins, the voltage level of the reference voltage Vref may also change. For example, as the source driving voltage SVDD decreases, the reference voltage Vref may also decrease or increase.

Referring to FIG. 8, the third time point t3 may be a timing when the second active period ACT2 begins. At the third time point t3, the voltage level of the source driving voltage SVDD may decrease, and as the voltage level of the source driving voltage SVDD decreases, there may be occurred a problem in which the voltage level of the reference voltage Vref fluctuates. For example, at the third time point t3, as the source driving voltage SVDD decreases, the reference voltage Vref may also decrease.

Accordingly, embodiments of the present disclosure may provide a display device 100 capable of stably controlling the source driving voltage SVDD.

Embodiments of the present disclosure may provide a display device 100 capable of stably controlling the reference voltage Vref.

Embodiments of the present disclosure may provide a display device 100 capable of supplying a stable voltage during the active period.

Embodiments of the present disclosure may provide a display device 100 capable of low power consumption due to a stable voltage control. This will be explained in detail below.

Figure 9:
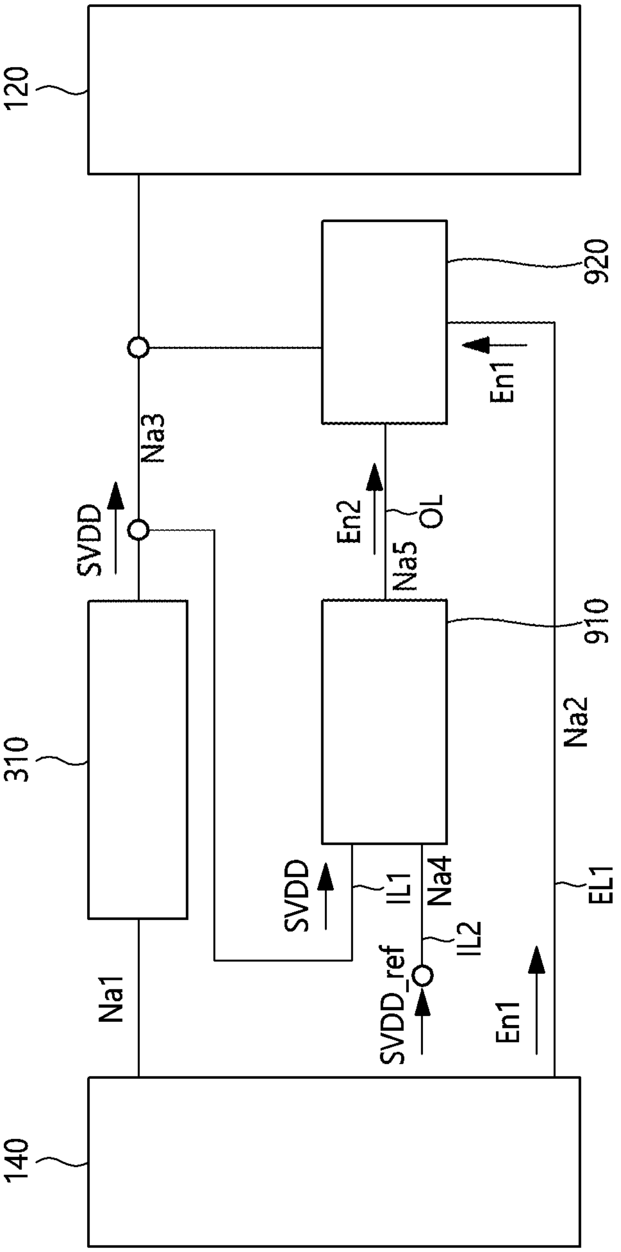
FIG. 9 illustrates a comparison circuit and a discharge circuit according to embodiments of the present disclosure.

FIG. 9 illustrates a comparison circuit 910 and a discharge circuit 920 according to embodiments of the present disclosure.

The display device 100 may include a data driving circuit 120, a power management integrated circuit 310, a controller 140, a comparison circuit 910, and a discharge circuit 920. The comparison circuit 910 and the discharge circuit 920 may be disposed on a source printed circuit board or a control printed circuit board.

The data driving circuit 120 may drive the display panel 110. The data driving circuit 120 may be electrically connected to the power management integrated circuit 310.

The controller 140 may control the data driving circuit 120, the power management integrated circuit 310, and the discharge circuit 920.

The controller 140 may be electrically connected to the power management integrated circuit 310 and a first node Na1.

The controller 140 may control the power management integrated circuit 310, and may output a first control signal En1.

The controller 140 may output the first control signal En1 to the discharge circuit 920 through a first control line EL1.

The controller 140 may output a source driving voltage control signal VCS to the power management integrated circuit 310, and the power management integrated circuit 310 may control the voltage level of the source driving voltage SVDD based on the source driving voltage control signal VCS.

The power management integrated circuit 310 may be electrically connected to the controller 140, the data driving circuit 120, the comparison circuit 910, and the discharge circuit 920.

The power management integrated circuit 310 may be electrically connected to the controller 140 and the first node Na1.

The power management integrated circuit 310 may supply the source driving voltage SVDD to the data driving circuit 120.

The power management integrated circuit 310 may supply the source driving voltage SVDD to the comparison circuit 910.

The comparison circuit 910 may output an output signal based on the input signal. For example, the comparison circuit 910 may receive the source driving voltage SVDD and a reference driving voltage SVDD_ref, and output a second control signal En2.

The comparison circuit 910 may receive the source driving voltage SVDD through a first input line IL1.

The comparison circuit 910 may receive a reference driving voltage SVDD_ref through a second input line IL2.

The reference driving voltage SVDD_ref may be the voltage level of the source driving voltage SVDD with the lowest voltage level. For example, the reference driving voltage SVDD_ref may be 12 [V]. The reference driving voltage SVDD_ref may be a voltage supplied from outside the display device 100. While the display device 100 is driven, the reference driving voltage SVDD_ref may be maintained without changing the voltage level.

The comparison circuit 910 may compare the source driving voltage SVDD and the reference driving voltage SVDD_ref, and output a second control signal En2 to an output line OL. Also, the discharge circuit 920 may receive the second control signal En2 through the output line OL. Further, the discharge circuit 920 may receive the first control signal En1 through the first control line EL1.

If the source driving voltage SVDD is greater than the reference driving voltage SVDD_ref, the comparison circuit 910 may output the second control signal En2 in a high level state to the discharge circuit 920.

If the source driving voltage SVDD is less than the reference driving voltage SVDD_ref, the comparison circuit 910 may output the second control signal En2 in a low level state to the discharge circuit 920.

The discharge circuit 920 may lower the voltage level of the source driving voltage SVDD. That is, the discharge circuit 920 may discharge the source driving voltage SVDD.

The discharge circuit 920 may be electrically connected to the comparison circuit 910 and the controller 140. For example, the discharge circuit 920 may receive the first control signal En1 output from the controller 140 and the second control signal En2 output from the comparison circuit 910, and discharge the source driving voltage SVDD.

The discharge circuit 920 may be electrically connected to the comparison circuit 910 through the output line OL of the comparison circuit 910.

The discharge circuit 920 may be electrically connected to the controller 140 through the first control line EL1.

The discharge circuit 920 may compare the first control signal En1 and the second control signal En2, and discharge the source driving voltage SVDD.

The discharge circuit 920 may discharge the source driving voltage SVDD in response to receive the second control signal En2 in a high level state and the first control signal En1 in a high level state. The timing at which the voltage levels of the first control signal En1 and the second control signal En2 change will be described below with reference to FIG. 12.

That is, the discharge circuit 920 may rapidly discharge the source driving voltage SVDD, so that there may be solved the problem of the delay in the time for the source driving voltage SVDD to decrease. The discharge circuit 920 may rapidly discharge the source driving voltage SVDD. Accordingly, even during the blank period before the active period, there may be solved the problem of a fluctuation of the reference voltage Vref due to the rapid discharge of the source driving voltage SVDD. The voltage level of the reference voltage Vref may be maintained stably, and the reference voltage Vref may be maintained stably even during the active period. Accordingly, screen abnormalities may not occur in the display panel 110 even during the active period.

The comparison circuit 910 and the discharge circuit 920 may be designed by various methods. For example, the comparison circuit 910 and discharge circuit 920 may be designed as shown in FIG. 10, which will be explained below.

Figure 10:
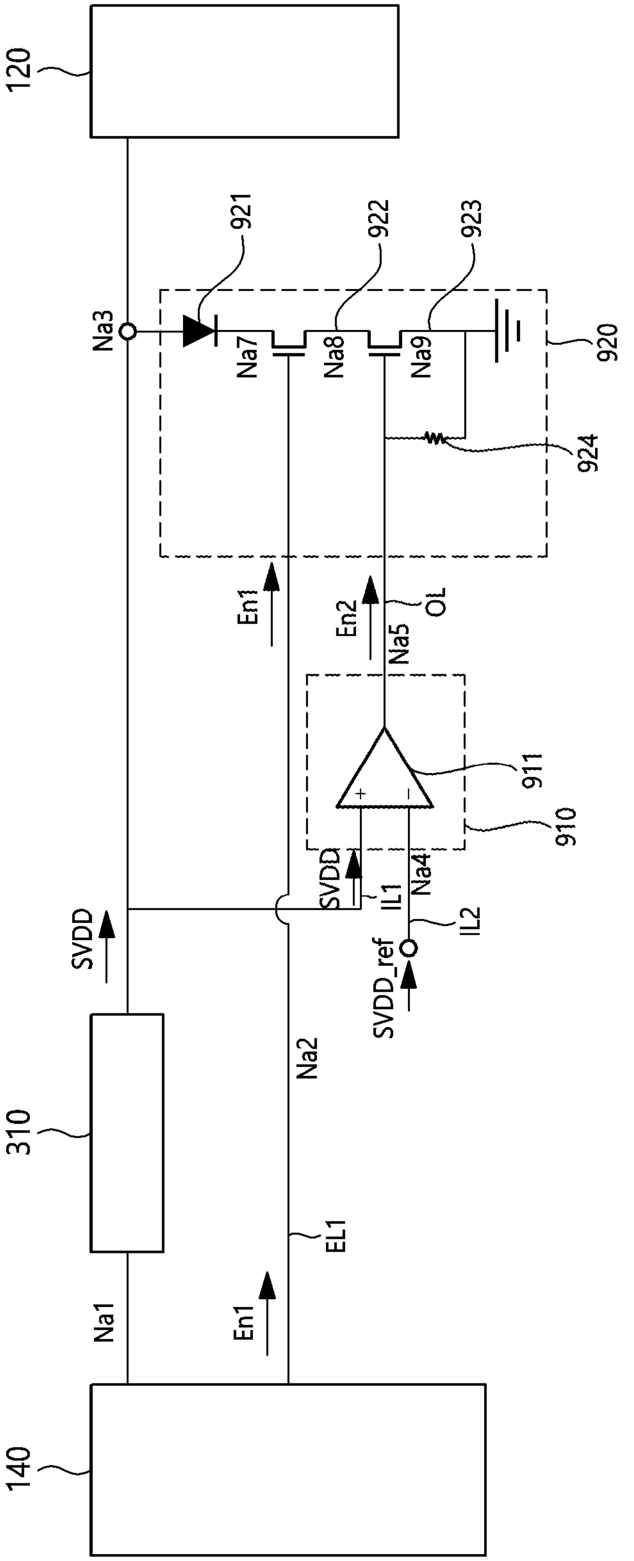
FIG. 10 illustrates a comparison circuit and a discharge circuit according to embodiments of the present disclosure.

FIG. 10 illustrates a comparison circuit 910 and a discharge circuit 920 according to embodiments of the present disclosure.

Figures 11, 12:
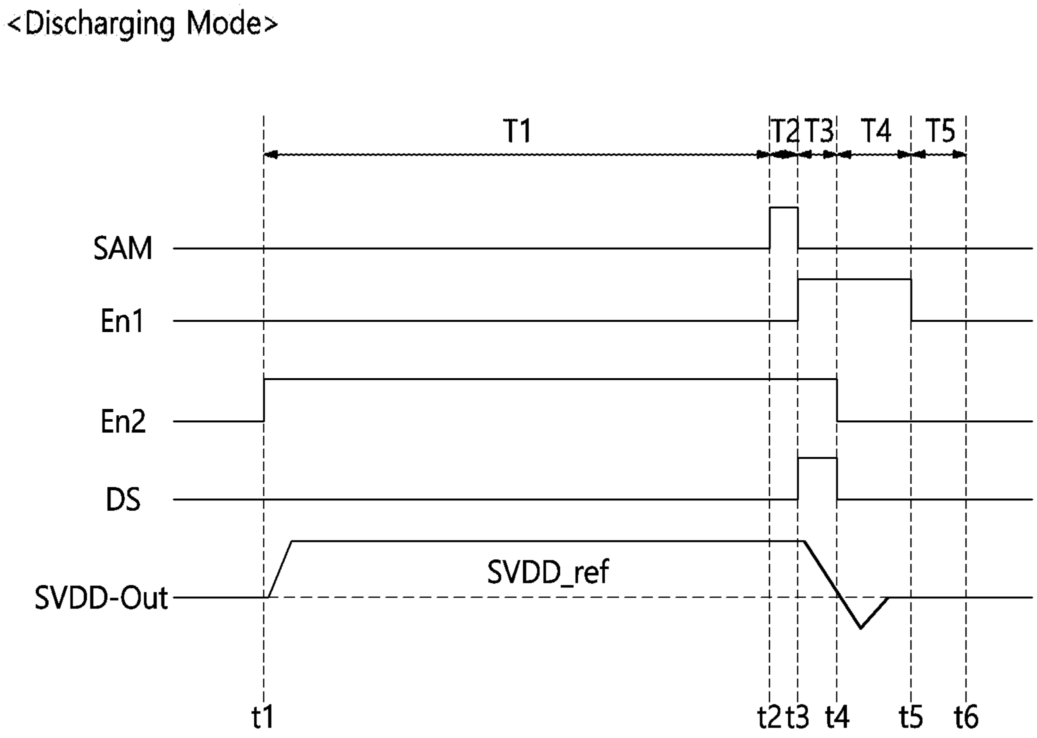
FIG. 11 is a truth table based on a first control signal and a second control signal according to embodiments of the present disclosure.
FIG. 12 is a timing diagram of a discharging mode operation of a display device according to embodiments of the present disclosure.

FIG. 11 is a truth table based on a first control signal En1 and a second control signal En2 according to embodiments of the present disclosure.

The comparison circuit 910 may include a comparator circuit including an operational amplifier.

The comparison circuit 910 may include a first input terminal (+), a second input terminal (−), and an output terminal.

The first input terminal (+) may be electrically connected to the first input line IL1. The first input terminal (+) may be supplied with the source driving voltage SVDD.

The second input terminal (−) may be electrically connected to a second input line IL2. The second input terminal (−) may be supplied with a reference driving voltage SVDD_ref.

The output terminal may be electrically connected to the output line OL. The output terminal may output a second control signal En2.

The comparison circuit 910 may compare the source driving voltage SVDD and the reference driving voltage SVDD_ref, and output the second control signal En2 to the output line OL.

If the source driving voltage SVDD is greater than the reference driving voltage SVDD_ref, the comparison circuit 910 may output the second control signal En2 in a high level state to the discharge circuit 920.

If the source driving voltage SVDD is less than the reference driving voltage SVDD_ref, the comparison circuit 910 may output the second control signal En2 in a low level state to the discharge circuit 920.

The discharge circuit 920 may include a diode 921, a first discharge transistor 922, a second discharge transistor 923, and a resistance element 924. The discharge circuit 920 may be configured to compare the first control signal En1 output from the controller 140 and the second control signal En2 output from the comparison circuit 910 and discharging the source driving voltage SVDD.

The diode 921 may prevent reverse voltage phenomenon. The diode 921 may be electrically connected to a node to which the source driving voltage SVDD of the data driving circuit 120 is supplied. The diode 921 may be electrically connected between a third node Na3 and a seventh node Na7. The diode 921 may be electrically connected to the first discharge transistor 922. The first discharge transistor 922 may be electrically connected to the second discharge transistor 923.

The first discharge transistor 922 may be electrically connected between the diode 921 and the second discharge transistor 923.

A gate node of the first discharge transistor 922 may be supplied with the first control signal En1. The gate node of the first discharge transistor 922 may be electrically connected to the second node Na2.

The second discharge transistor 923 may be electrically connected between the first discharge transistor 922 and a ground node. The ground node may be a node to which a ground voltage is supplied.

A gate node of the second discharge transistor 923 may be supplied with the second control signal En2. The gate node of the second discharge transistor 923 may be electrically connected to a fifth node Na5.

The gate node of the second discharge transistor 923 may be electrically connected to the resistance element 924. The other end of the resistance element 924 may be electrically connected to ground node.

The resistance element 924 may be electrically connected between the gate node and the ground node of the second discharge transistor 923. The ground node may be a voltage to which the ground voltage is supplied.

Since the gate node of the second discharge transistor 923 is electrically connected to the resistance element 924, the voltage of the second discharge transistor 923 may be stably controlled.

Referring to FIG. 11, there is exemplified a truth table in which the discharge circuit 920 is driven. The discharge circuit 920 may be configured to compare the first control signal En1 output from the controller 140 and the second control signal En2 output from the comparison circuit 910 and discharge the source driving voltage SVDD.

If the first control signal En1 is a high level signal and the second control signal En2 is a high level signal, the discharge circuit 920 may be operated in a discharging mode. In the case that the discharge circuit 920 is operated in the discharging mode, the voltage level of the source driving voltage SVDD may rapidly decrease. Thus, if the first control signal En1 is a high level signal and the second control signal En2 is a high level signal, the discharge circuit 920 may discharge the source driving voltage SVDD. In this case, the first discharge transistor 922 and the second discharge transistor 923 may be turned on, and the voltage level of the source driving voltage SVDD on the data driving circuit 120 side may be rapidly discharged to a ground voltage level.

If the first control signal En1 is a high level signal and the second control signal En2 is a low level signal, the discharge circuit 920 may not operate in the discharging mode.

If the first control signal En1 is a low level signal and the second control signal En2 is a high level signal, the discharge circuit 920 may not operate in the discharging mode.

If the first control signal En1 is a low level signal and the second control signal En2 is a low level signal, the discharge circuit 920 may not operate in the discharging mode.

That is, the discharge circuit 920 may discharge the source driving voltage SVDD only when both of the first control signal En1 and the second control signal En2 are high level signals.

The discharge circuit 920 may not operate in a discharging mode when there is no need to quickly discharge the source driving voltage SVDD.

Hereinafter, it will be described the operation timing of the comparison circuit 910 and the discharge circuit 920 shown in FIGS. 9 and 10.

FIG. 12 is a timing diagram of a discharging mode operation of a display device 100 according to embodiments of the present disclosure.

Figure 13:
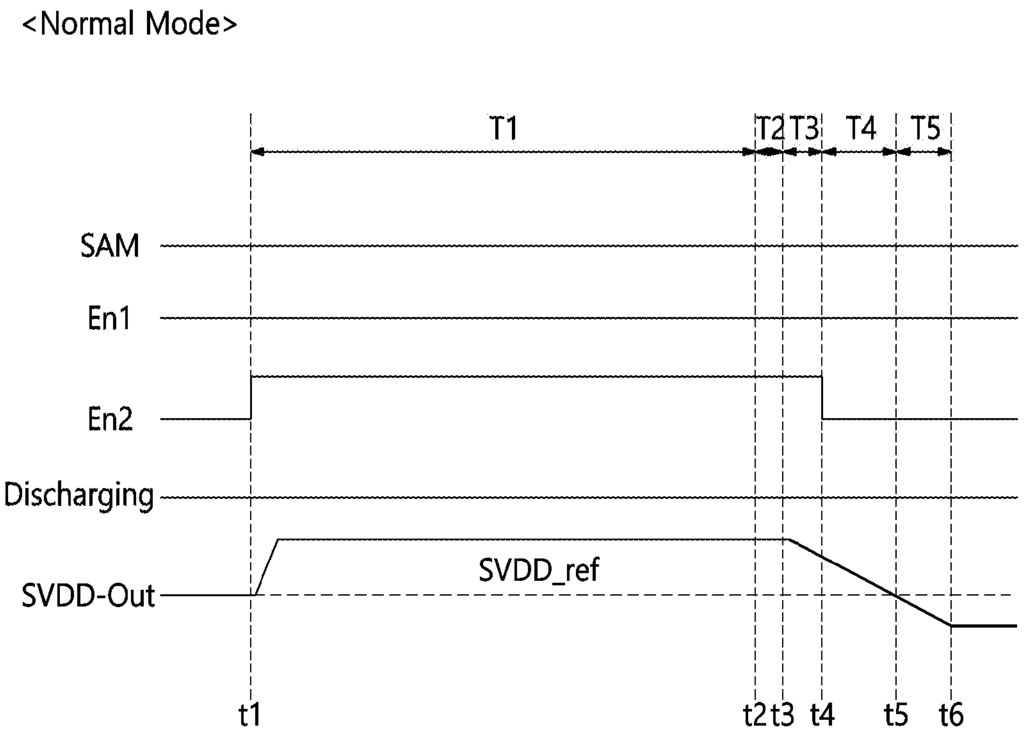
FIG. 13 is a timing diagram of a normal mode operation of a display device according to embodiments of the present disclosure.

FIG. 13 is a timing diagram of a normal mode operation of a display device 100 according to embodiments of the present disclosure.

Referring to FIG. 12, a first period T1 may be a period between a first time point t1 and a second time point t2.

A real-time sensing process may proceed during the first period T1. The real-time sensing process may proceed during a blank period. The period during which the discharge circuit 920 is in a discharging mode may be the blank period. For example, the real-time sensing process may proceed during every blank period, based on the vertical synchronization signal, without being limited thereto.

Referring to FIG. 12, the source driving voltage SVDD may increase at the first time point t1. Here, the source driving voltage SVDD may be the same as a source driving voltage SVDD-Out on the data driving circuit side.

The real-time sensing process may proceed after the first time point t1, and at the second time point t2, a sampling signal SAM may become a high level signal from a low level signal and a sampling operation may be performed. The sampling operation may proceed from the second time point t2 to a third time point t3. For example, at the third time point t3, the sampling signal SAM may become a low level signal from a high level signal.

Referring to FIG. 12, a second period T2 may proceed after the first period T1. The second period T2 may be a period between the second time point t2 and a third time point t3.

The period during which the sampling operation is performed may be the second period T2.

The first control signal En1 may be in a low level state during the second period T2.

During the period from the first time point t1 to the third time point t3, the source driving voltage SVDD may be greater than the reference driving voltage SVDD_ref, and the second control signal En2 may be in a high level state. That is, the second control signal En2 may be in a high level state during the third period T3.

Referring to FIG. 12, the third period T3 may proceed after the second period T2. The third period T3 may be a period between the third time point t3 and a fourth time point t4.

The first control signal En1 may be in a high level state from the third time point t3. However, depending on the design, the first control signal En1 may be at a high level even before the sampling period terminates. In this case, when the sampling signal SAM is in a high level state, the first control signal En1 may also be in a high level state.

During the third period T3, the first control signal En1 and the second control signal En2 may be at a high level, so that the discharge circuit 920 may be operated in the discharging mode. Thus, if the first control signal En1 is a high level signal and the second control signal En2 is a high level signal, the discharge circuit 920 may discharge the source driving voltage SVDD. Referring to FIG. 12, it is illustrated that a discharge signal DS indicating the discharging mode is in a high level state. While the discharge circuit 920 operates in a discharging mode, the source driving voltage SVDD may be rapidly discharged.

Referring to FIG. 12, during the third period T3 between the third time point t3 and a fourth time point t4, the source driving voltage SVDD may decrease, and the source driving voltage SVDD may be equal to the reference driving voltage SVDD_ref at the fourth time point t4. Accordingly, the second control signal En2 may change from a high level state to a low level state. Since the first control signal En1 is in a high level state but the second control signal En2 is in a low level state, the discharge circuit 920 may not be operated in the discharging mode.

Referring to FIG. 12, a fourth period T4 may proceed after the third period T3. The fourth period T4 may be a period between the fourth time point t4 and a fifth time point t5.

The source driving voltage SVDD may be equal to the reference driving voltage SVDD_ref at the fourth time point t4. Since the source driving voltage SVDD has dropped to the voltage level of the reference driving voltage SVDD_ref, the discharging mode may be in an off state.

Referring to FIG. 12, the first control signal En1 may be a high level signal during the fourth period T4. After the voltage level of the source driving voltage SVDD is sufficiently discharged, the first control signal En1 may change from a high level state to a low level state. Depending on the design, the fourth period T4 may be set to be short. For example, the first control signal En1 may also become low level immediately after the second control signal En2 becomes low level. For example, the first control signal En1 may become low level after a predetermined time elapses after the second control signal En2 becomes low level.

The first control signal En1 may be in a low level state during the blank period. In this case, the source driving voltage SVDD may be discharged before the active period proceeds. However, if the sampling period is delayed, the first control signal En1 may be at a low level in the active period which follows the blank period.

A fifth period T5 may proceed after the fourth period T4. The fifth period T5 may be a period between the fifth time point t5 and a sixth time point T6.

During the fifth period T5, the first control signal En1 may be in a low level state.

During the fifth period T5, the second control signal En2 may be in a low level state.

When the fifth period T5 has been reached, the source driving voltage may rapidly decrease in voltage level. That is, there has been reached the source driving voltage for the active period, and the reference voltage may be stably controlled accordingly.

Next, it will be described the timing operation shown in FIG. 13.

Referring to FIG. 13, there is illustrated diagram for the timing at which the discharge circuit 920 operates in a normal mode.

Referring to FIG. 13, after the off-sensing process proceeds, the discharge circuit 920 may be operated in the normal mode. Since the off-sensing process has also completed, the sampling signal SAM may be maintained at a low level even during the second period T2.

When the normal mode is in progress, there is no need to rapidly discharge the source driving voltage SVDD, so that the discharge circuit 920 may be operated in the normal mode. Accordingly, the source driving voltage SVDD may gradually decrease. For example, the source driving voltage SVDD may gradually decrease between the third time point t3 and the sixth time point t6.

Figure 14:
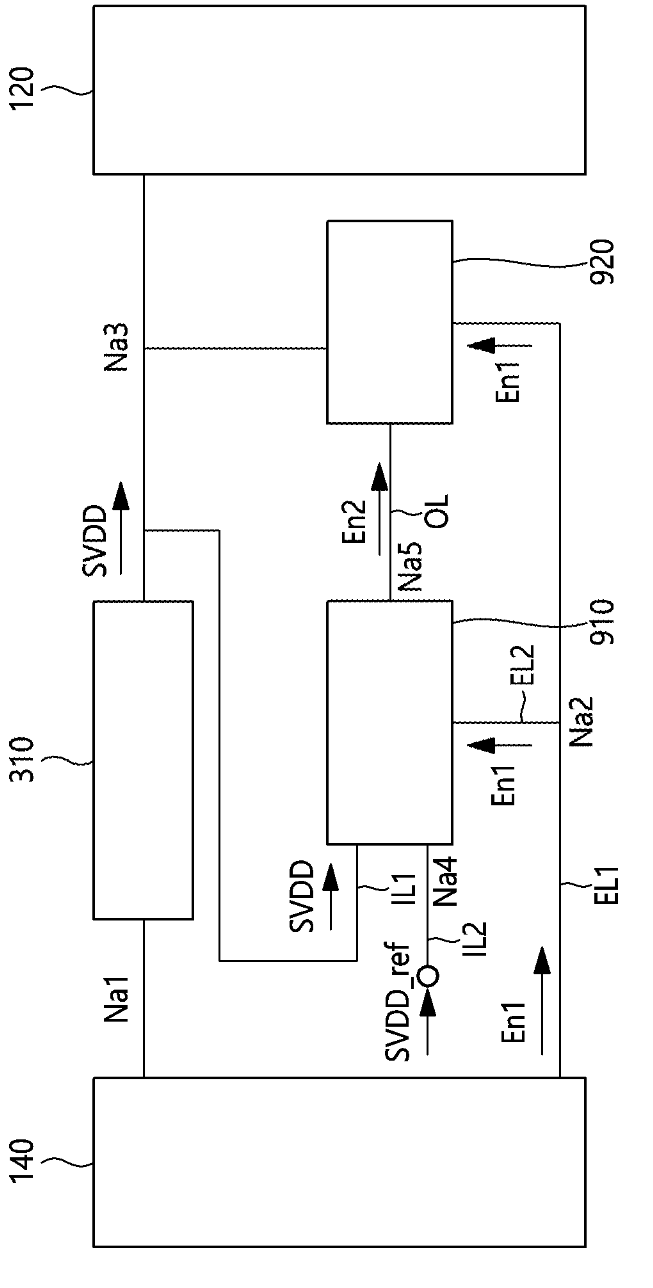
FIG. 14 illustrates a comparison circuit and a discharge circuit according to embodiments of the present disclosure.

FIG. 14 illustrates a comparison circuit 910 and a discharge circuit 920 according to embodiments of the present disclosure.

Figure 15:
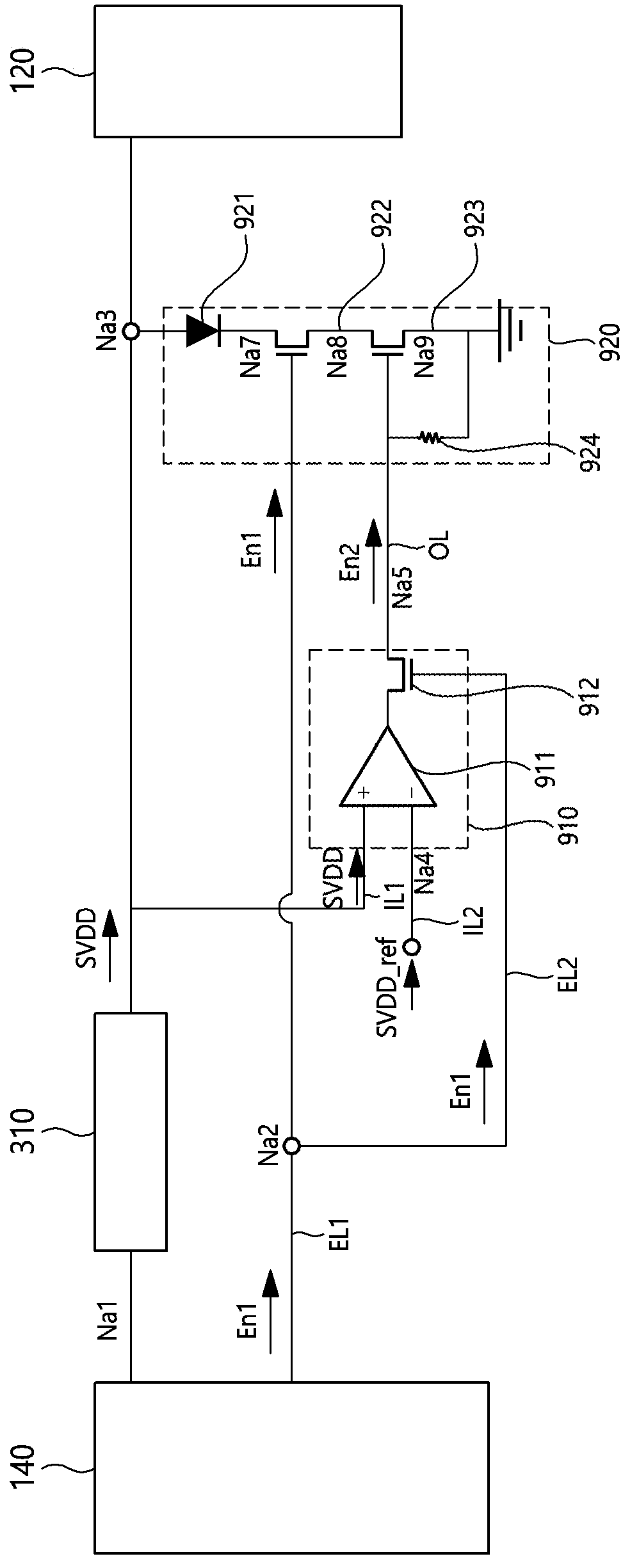
FIG. 15 illustrates a comparison circuit and a discharge circuit according to embodiments of the present disclosure.

FIG. 15 illustrates a comparison circuit 910 and a discharge circuit 920 according to embodiments of the present disclosure.

Referring to FIGS. 14 and 15, the controller 140 may be electrically connected to the comparison circuit 910.

Referring to FIGS. 14 and 15, the controller 140 may supply the first control signal En1 to the comparison circuit 910.

Referring to FIG. 14, the comparison circuit 910 may be controlled to be turned on or turned off according to the first control signal En1.

Referring to FIG. 15, the comparison circuit 910 may further include a control transistor 912.

Referring to FIG. 15, the control transistor 912 may be electrically connected between an output terminal of the comparison circuit 910 and a gate node of the second discharge transistor 923. For example, the control discharge transistor 912 may be electrically connected between an output terminal of the comparator circuit 911 and a gate node of the second discharge transistor 923.

Referring to FIG. 15, a gate node of the control transistor 912 may be electrically connected to the controller 140. The gate node of the control transistor 912 may be supplied with the first control signal En1.

That is, since the comparison circuit 910 further includes the control transistor 912, the comparison circuit 910 may be controlled to be turned on or turned off according to the first control signal En1.

Figure 16:
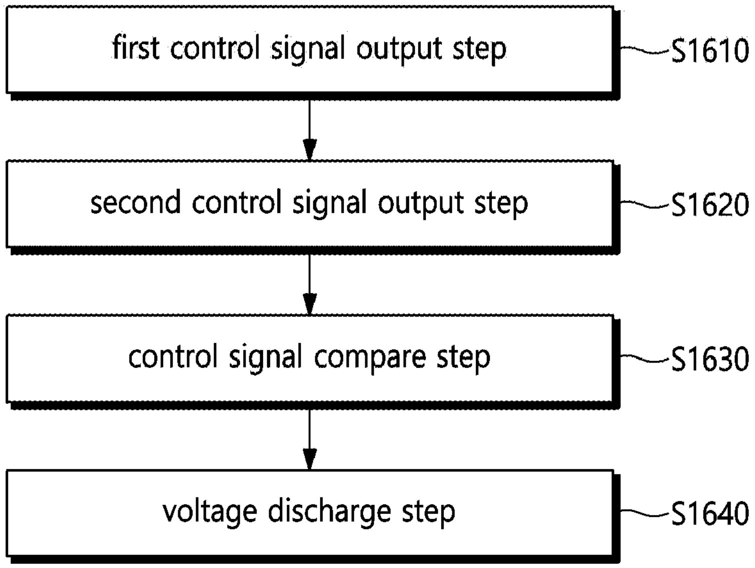
FIG. 16 is a flowchart of a driving method of a display device according to embodiments of the present disclosure.

FIG. 16 is a flowchart of a driving method of a display device 100 according to embodiments of the present disclosure.

A driving method of a display device 100 may include a first control signal output step (S1610), a second control signal output step (S1620), a control signal comparison step (S1630), and a voltage discharge step (S1640).

The first control signal output step (S1610) may be a step in which the controller 140 for controlling the data driving circuit 120 outputs the first control signal En1 to the discharge circuit 920.

The second control signal output step (S1620) may be a step in which the comparison circuit 910 compares the source driving voltage SVDD and the reference driving voltage SVDD_ref and outputs the second control signal En2.

The control signal comparison step S1630 may be a step in which the discharge circuit 920 compares the first control signal En1 and the second control signal En2.

In the control signal comparison step (S1630), when the comparison circuit 910 receives the first control signal En1 in a low level state, the comparison circuit 910 may be in a turn-off state.

The voltage discharge step (S1640) may be a step in which the discharge circuit 920 may discharge the source driving voltage SVDD.

In the voltage discharge step (S1640), the discharge circuit 920 may discharge the source driving voltage SVDD if the source driving voltage SVDD is greater than the reference driving voltage SVDD_ref.

In the voltage discharge step (S1640), the discharge circuit 920 may discharge the source driving voltage SVDD when receiving the first control signal En1 in a high level state.

In the voltage discharge step (S1640), the discharge circuit 920 may not discharge the source driving voltage SVDD when receiving the first control signal En1 in a low level state.

In the voltage discharge step (S1640), the discharge circuit 920 may discharge the source driving voltage SVDD when receiving the first control signal En1 in a high level state and the second control signal En2 in a high level state.

Embodiments of the present disclosure described above are briefly described as follows.

A display device according to embodiments of the present disclosure may include a display panel on which a plurality of subpixels are disposed, a data driving circuit for driving the display panel, a power management integrated circuit for supplying a source driving voltage to the data driving circuit, a controller for controlling the power management integrated circuit and outputting a first control signal, a comparison circuit for comparing the source driving voltage and a reference driving voltage and outputting a second control signal, and a discharge circuit for comparing the first control signal and the second control signal output from the comparison circuit and discharging the source driving voltage.

The comparison circuit may output the second control signal in a high level state to the discharge circuit if the source driving voltage is greater than the reference driving voltage.

The discharge circuit may discharge the source driving voltage in response to receive the second control signal in the high level state and the first control signal in a high level state.

The discharge circuit may further include a diode, and the first discharge transistor may be electrically connected between the diode and the second discharge transistor.

The discharge circuit may further include a resistance element, and the resistance element may be electrically connected to a gate node of the second discharge transistor.

The comparison circuit may include a first input terminal supplied with the source driving voltage, a second input terminal supplied with the reference driving voltage, and an output terminal for outputting the second control signal.

The control discharge transistor may be configured to control the turned on or turned off of the the comparison circuit according to the first control signal.

The discharge circuit may include a first discharge transistor supplied with the first control signal to a gate node, and a second discharge transistor supplied with the second control signal to a gate node.

The comparison circuit may include a control discharge transistor electrically connected between the gate node of the second discharge transistor and an output terminal of the comparison circuit.

The controller may output a source driving voltage control signal to the power management integrated circuit, and the power management integrated circuit may control a voltage level of the source driving voltage based on the source driving voltage control signal.

A period during which the plurality of subpixels are driven may include an active period for displaying an image on the display panel, and a blank period for detecting characteristic values of the plurality of subpixels. In this case, the discharge circuit may discharge the source driving voltage during the blank period.

The discharge circuit may be supplied with the first control signal in a high level state during the blank period.

The comparison circuit ma be turned off in response to receive the first control signal in a low level state during the blank period.

A driving method of a display device according to embodiments of the present disclosure may include outputting, by a controller controlling a data driving circuit, a first control signal to a discharge circuit, comparing, by a comparison circuit, a source driving voltage and a reference driving voltage and outputting a second control signal, comparing, by the discharge circuit, the first control signal and the second control signal, and discharging, by the discharge circuit, the source driving voltage.

The discharging may include discharging the source driving voltage when the source driving voltage is greater than the reference driving voltage.

The discharging may include discharging the source driving voltage when the discharge circuit receives the second control signal in a high level state.

The discharging may include discharging the source driving voltage when the discharge circuit receives the first control signal in a high level state.

The discharging may include not discharging the source driving voltage when the discharge circuit receives the first control signal in a low level state.

In the comparing the first control signal and the second control signal, the comparison circuit may be turned off when the comparison circuit receives the first control signal in a low level state.

A display device according to exemplary embodiments of the present disclosure may include a power management integrated circuit configured to supply a source driving voltage; a controller configured to output a first control signal; a comparison circuit configured to compare the source driving voltage and a reference driving voltage and output a second control signal; and a discharge circuit configured to compare the first control signal output from the controller and the second control signal output from the comparison circuit and discharging the source driving voltage.

The above description and the accompanying drawings provide an example of the technical idea of the present disclosure for illustrative purposes only. Various modifications, additions and substitutions to the described embodiments will be readily apparent to those skilled in the art without departing from the spirit and scope of the present disclosure. In addition, the disclosed embodiments are intended to illustrate the scope of the technical idea of the present disclosure. Thus, the scope of the present disclosure is not limited to the embodiments shown.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:

a display panel on which a plurality of subpixels are disposed;

a data driving circuit for driving the display panel;

a power management integrated circuit for supplying a source driving voltage to the data driving circuit;

a controller configured to output a first control signal through a first signal line;

a comparison circuit configured to compare the source driving voltage and a reference driving voltage and output a second control signal through a second signal line based on the comparing the source driving voltage and the reference driving voltage; and a discharge circuit configured to form a discharge path for discharging the source driving voltage based on the first control signal and the second control signal.

2. The display device of claim 1, wherein the comparison circuit is configured to output the second control signal in a high level state to the discharge circuit in response to the source driving voltage is greater than the reference driving voltage.

3. The display device of claim 2, wherein the discharge circuit is configured to discharge the source driving voltage in response to receiving the second control signal in the high level state and the first control signal in a high level state.

4. The display device of claim 1, wherein the comparison circuit includes:

a first input terminal configured to receive the source driving voltage;

a second input terminal configured to receive the reference driving voltage; and an output terminal for outputting the second control signal.

5. The display device of claim 1, wherein the discharge circuit includes:

a first discharge transistor configured to be supplied with the first control signal to a gate node; and a second discharge transistor configured to be supplied with the second control signal to a gate node.

6. The display device of claim 5, wherein the discharge circuit further includes a diode, and the first discharge transistor is electrically connected between the diode and the second discharge transistor.

7. The display device of claim 5, wherein the discharge circuit further includes a resistance element, and the resistance element is electrically connected to a gate node of the second discharge transistor.

8. The display device of claim 5, wherein the comparison circuit includes a control discharge transistor electrically connected between the gate node of the second discharge transistor and an output terminal of the comparison circuit.

9. The display device of claim 8, wherein the control discharge transistor is configured to control the turned on or turned off of the comparison circuit according to the first control signal.

10. The display device of claim 1, wherein the controller is configured to output a source driving voltage control signal to the power management integrated circuit, wherein the power management integrated circuit is configured to control a voltage level of the source driving voltage based on the source driving voltage control signal.

11. The display device of claim 1, wherein a period during which the plurality of subpixels are driven includes:

an active period for displaying an image on the display panel; and a blank period for detecting characteristic values of the plurality of subpixels, wherein the discharge circuit is configured to discharge the source driving voltage during the blank period.

12. The display device of claim 11, wherein the discharge circuit is configured to be supplied with the first control signal in a high level state during the blank period.

13. The display device of claim 11, wherein the second signal line is configured to be turned off in response to the first control signal is in a low level state during the blank period.

14. A driving method of a display device comprising:

outputting, by a controller, a first control signal to a discharge circuit through a first signal line;

comparing, by a comparison circuit, a source driving voltage and a reference driving voltage and outputting a second control signal through a second signal line based on a result of the comparing the source driving voltage and the reference driving voltage;

receiving, by the discharge circuit, the first control signal and the second control signal; and discharging, by the discharge circuit, the source driving voltage based on the first control signal and the second control signal.

15. The driving method of claim 14, wherein the discharging the source driving voltage comprises discharging the source driving voltage when the source driving voltage is greater than the reference driving voltage.

16. The driving method of claim 14, wherein the discharging the source driving voltage comprises discharging the source driving voltage when the discharge circuit receives the first control signal in a high level state.

17. The driving method of claim 14, wherein the discharging comprises discharging the source driving voltage when the discharge circuit receives the second control signal in a high level state.

18. The driving method of claim 14, further comprising not discharging the source driving voltage when the discharge circuit receives the first control signal in a low level state.

19. The driving method of claim 14, wherein the second control signal is not received by the discharge circuit when the first control signal is in a low level state.

20. A display device comprising:

a power management integrated circuit configured to supply a source driving voltage;

a controller configured to output a first control signal through a first signal line;

a comparison circuit configured to compare the source driving voltage and a reference driving voltage and output a second control signal through a second signal line based on a result of the comparing the source driving voltage and the reference driving voltage; and a discharge circuit configured to discharge the source driving voltage based on the first control signal received from the first signal line and the second control signal received from the second signal line.

* * * * *